United States Patent [19]

Tohmon et al.

[11] Patent Number: 5,341,237
[45] Date of Patent: Aug. 23, 1994

[54] RARE EARTH ION DOPED OPTICAL ELEMENT

[75] Inventors: Genji Tohmon; Hisanao Sato; Toshihiro Fujita; Jun Ohya, all of Osaka, Japan

[73] Assignee: Matsushita Electric Industrial Co., Ltd., Osaka, Japan

[21] Appl. No.: 830,311

[22] Filed: Jan. 31, 1992

[30] Foreign Application Priority Data

Sep. 27, 1991 [JP] Japan .................................. 3-249486

[51] Int. Cl.$^5$ ................................................. H01S 3/14
[52] U.S. Cl. ........................................ 359/341; 372/68
[58] Field of Search .............. 372/6, 41, 68; 359/341, 359/342

[56] References Cited

U.S. PATENT DOCUMENTS

| | | | |
|---|---|---|---|
| 3,591,517 | 7/1971 | Van Der Ziel et al. | 372/41 |
| 3,599,109 | 8/1971 | Guggenheim et al. | 372/68 |
| 4,347,485 | 8/1982 | Esterowitz et al. | 372/42 |
| 4,701,928 | 10/1987 | Fan et al. | 372/68 |
| 4,809,293 | 2/1989 | DeBell et al. | 372/98 |
| 5,088,103 | 2/1992 | Esterowitz et al. | 372/41 |
| 5,119,230 | 6/1992 | Pfeiffer | 359/341 |

FOREIGN PATENT DOCUMENTS

| | | |
|---|---|---|
| 0450677 | 10/1991 | European Pat. Off. . |
| 4007495 | 9/1991 | Fed. Rep. of Germany . |
| 2241949 | 9/1991 | United Kingdom . |

OTHER PUBLICATIONS

R. Stoneman et al., *Continuous-Wave 1.5 μm Thulium Cascade Laser,* Optics Letters, vol. 16, p. 232 (1991).

Y. Durteste et al., *Amplification and Lasing at 1.3 μm in Praseodymium-Doped Fluorozirconate Fibres,* Electronics Letters, vol. 27, p. 626 (1991).

Rosenblatt et al., "Laser Emission at 1.47 μm from Fluorozirconate Glass Doped with $Tm^{3+}$ and $Tb^{3+}$", OSA Proc. Ser. Tunable Solid State Laser, 1989, pp. 373-376.

Huber et al., "Laser Pumping of Ho-, Tm-, Er-Doped Garnet Lasers at Room Temperature", IEEE Journal of Quantum Electronics, vol. 24, No. 6 Jun. 1988, pp. 920-923.

Fan et al., "Diode Laser-Pumped Solid-State Lasers", IEEE Journal of Quantum Electronics, vol. 24, No. 6, Jun. 1988, pp. 895-912.

Chen et al., "Concentration-Dependent Energy-Transfer Processes In $Er^{3+}$- and $Tm^{3+}$-doped Heavy-Metal Fluoride Glass", Optics Letters, vol. 14, No. 9, May 1989, pp. 432-434.

Smart et al., "Continuous-wave Oscillation of $Tm^{3+}$-doped Fluorozirconate Fibre Laser At Around 1.47 μm, 1.9 μm and 2.3 μm When Pumped At 790 nm", Optics Communications, vol. 82, No. 5/6, May 1991, pp. 563-570.

Hanna et al., "A 1.54 μm Er Glass Laser Pumped By A 1.064 μm Nd: YAG Laser", Optics Communications, vol. 63, No. 6, Sep. 1987, pp. 417-420.

Berthou et al., "Optical-fiber temperature sensor base on up-conversion fluorescence", Optics Letters, vol. 15, #19, Oct. 1990.

*Primary Examiner*—Ian J. Lobo
*Attorney, Agent, or Firm*—Willian Brinks Hofer Gilson & Lione

[57] ABSTRACT

The effective rate of deactivation from the terminal state to the ground state of a rare earth ion doped optical material in a four-level amplifying or lasing scheme may be increased greatly by doping the optical material with two rare earth ions, an activator and a deactivator. Energy transfer occurs between the terminal state in the activator ion and the deactivator ion. The transition from the deactivator to the ground state occurs via phonon emission. By increasing the deactivation rate, the efficiency of the laser and the amplifier is increased.

12 Claims, 21 Drawing Sheets

RARE EARTH ION DOPED OPTICAL ELEMENT

BACKGROUND OF THE INVENTION

The present invention relates to a rare earth ion doped optical element used in the fields of light communication, light information processing, light applied instrumentation control and the like to which coherent light is applied, for example, a rare earth ion doped solid state optical element, a rare earth ion doped optical fiber element, a rare earth ion doped laser element and a rare earth ion doped optical amplifying element.

As the first prior art of the rare earth ion doped laser element, there has been known "Continuous-wave 1.5 μm thulium cascade laser" (Optics Letters vol. 16, p. 232, 1991) written by R. C. Stoneman and L. Esterowitz.

FIG. 18 shows the structure of the rare earth ion doped laser element. In FIG. 18, the reference numeral 11 denotes a laser crystal comprised of YLiF$_4$, the reference numeral 12 denotes an incident portion of the laser crystal 11, the reference numeral 13 denotes an emitting portion of the laser crystal 11, the reference numeral 14 denotes an incident lens, the reference numeral 15 denotes excitation light, the reference numeral 16 denotes an output laser beam, the reference numeral 17 denotes a pump laser, and the reference numeral 18 denotes an emitting lens.

FIG. 19 shows the energy level transition of Tm (Thulium) ion when doped in the host laser crystal YLiF$_4$. Tm in this case is referred to as the activator ion. In FIG. 19, the reference numeral 21 denotes energy level transition caused by light absorption, the reference numeral 25 denotes energy level transition caused by phonon emission, the reference numeral 24 denotes energy level transition caused by light radiation, and the reference numerals 27, 28, 29 and 30 denote energy levels. An axis of ordinates 26 denotes energy with a unit of cm$^{-1}$ (kayser).

As shown in FIG. 18, the excitation light 15 having a wavelength of 795 nm emitted from the pump laser 17 is converged by the incident lens 14. The excitation light 15 thus converged is radiated onto the laser crystal 11 through the incident portion 12. In this case, the energy state of the Tm ion is raised from the ground state energy level 27 to the high energy level 28 by energy absorption as shown in the level transition 21. Then, the energy state of the Tm ion is lowered from the level 28 to the level 29 by phonon emission as shown in the level transition 25. Thereafter, the energy state of the Tm ion is lowered from the level 29 to the level 30 as shown in the level transition 24. When the level transition 24 is carried out, light having a wavelength of 1.5 μm is radiated. The level 30 is referred to as the terminal or lower level. The light thus radiated is caused to resonate by reflecting films provided on the incident portion 12 and the emitting portion 13, and is then emitted as a laser beam having a wavelength of 1.5 μm from the emitting portion 13.

As the second prior art of a rare earth ion doped laser element, there has been known "Amplification and Lasing at 1.3 μm in Praseodymium-doped Fluorozirconate Fibres" (Electronics Letters vol. 27, P. 626, 1991) written by Y. Durteste, M. Monerie, J. Y. Allain, and H. Poignant.

FIG. 20 shows the structure of a rare earth ion doped laser element. In FIG. 20, the reference numeral 51 denotes an optical fiber, the reference numeral 52 denotes an incident portion of the optical fiber 51, the reference numeral 53 denotes an emitting portion of the optical fiber 51, the reference numeral 54 denotes an incident lens, the reference numeral 58 denotes an emitting lens, the reference numeral 55 denotes excitation light, the reference numeral 56 denotes an output laser beam, and the reference numeral 57 denotes a pump laser.

FIG. 21 shows the energy level transition of Pr (Praseodymium) ion, i.e., Pr is in this case the activator ion, with which the optical fiber 51 is doped. In FIG. 21, the reference numeral 61 denotes level transition caused by light absorption, the reference numeral 64 denotes level transition caused by light radiation, and the reference numerals 67, 68 and 70 denote energy levels. An axis of ordinates 66 denotes energy with a unit of cm$^{-1}$.

The excitation light 55 having a wavelength of 1.017 μm emitted from the pump laser 57 is radiated onto the optical fiber 51 through the incident portion 52. The excitation light 55 is absorbed by the Pr ion. Consequently, the energy state of the Pr ion is shifted from the ground state energy level 67 to the high energy level 68 as shown in the level transition 61. Then, when the energy state of the Pr ion is shifted from the high energy level 68 to the terminal energy level 70 as shown in the level transition 64, light having a wavelength of 1.31 μm is radiated. The light thus radiated is caused to resonate by reflecting films provided on the incident portion 52 and the emitting portion 53 so that population inversion takes place between the levels 68 and 70. Then, the light is emitted as a laser beam having a wavelength of 1.31 μm from the emitting portion 53.

In the case where an optical amplifier is used, population inversion does not take place between the levels 68 and 70. The light having a wavelength of 1.31 μm which is incident as signal light on the optical fiber is amplified by light which is radiated at the time of transition from the level 68 to the level 70.

Referring to the Tm ion according to the first prior art, light is radiated so that a significant portion of the ions remains at the energy level 30. The reason is that the fluorescence lifetime of the level 30 is very long on the order of 10 ms and there is an energy difference of 5000 cm$^{-1}$ or more between the medium energy level 30 and the ground state energy level 27 so that the probability of transition from the level 30 to the level 27 by phonon emission is very small. Thus, the probability of returning to the level 27 is small so that the probability of transition to the high energy level is decreased. As a result, even if the power of the excitation light is increased, the absorption efficiency of the excitation light is lowered so that the output laser beams are reduced. Referring to a conventional 4-level laser element, the efficiency of the output light to the input light is low, i.e., about 13%.

Referring to the Pr ion according to the second prior art, light is radiated so that the energy level stays at the level 70. The reason is that the fluorescence lifetime of the level 70 is long and there is an energy difference of about 2000 cm$^{-1}$ between the medium energy level 70 and the ground state energy level 67 so that the probability of transition from the level 70 to the level 67 by phonon emission is small. Thus, the probability of returning to the level 67 is small so that the probability of transition to the high energy level is decreased. As a result, even if the power of the excitation light is increased, the absorption efficiency of the excitation light is lowered so that the output laser beams are reduced. Referring to the laser element according to the second prior art, the efficiency of the emitted light to the incident light is about 30%.

Referring to the above-mentioned rare earth ion doped laser elements, accordingly, it is important that the transition from the terminal energy level to the ground state energy level should be carried out efficiently. The number of rare earth ions in a given volume of the host material is limited. Consequently, if the population of the medium energy level is significant with respect to the population of the ground state energy level, the transition to the high energy level is decreased. Consequently, the absorption efficiency of the excitation light is lowered and high output is not obtained.

There has been proposed a method for cooling the laser element down to 7K. However, it is very difficult to execute this method in respect of practicality in an industrial environment.

SUMMARY OF THE INVENTION

To solve the above-mentioned problems, it is an object of the present invention to promote the level transition of rare earth ions from the terminal energy level to the ground state energy level so as to improve the absorption efficiency of excitation light and obtain high output.

To achieve the above-mentioned object, a rare earth ion doped solid state optical element according to the present invention comprises an optical material doped with a rare earth ion of a first type and a rare earth ion of a second type, wherein the energy state of the rare earth ion of the first type is raised in energy from the ground state level to a higher level, namely the first level, by means of absorption of incident excitation light which has energy in the wavelength range which corresponds to a range in which the rare earth ion of the first type absorbs energy, wherein the energy from the rare earth ion of the first type is lowered from the first level to a lower level, namely the second level, by means of non-radiative phonon emission, wherein the rare earth ion of the first type radiates energy in the form of light thus lowering the energy level of the rare earth ion of the first type from the second level to a lower level, namely the terminal level, wherein energy transfer occurs from the terminal level of the rare earth ion of the first type to a level of the rare earth ion of the second type, namely the fourth level, and wherein non-radiative phonon transition occurs from the fourth level to the ground state level.

A rare earth ion doped optical fiber element according to the present invention comprises an optical material which includes a high refractive index area and a low refractive index area surrounding the high refractive index area and which is doped with a rare earth ion of a first type and a rare earth ion of a second type in the high refractive index area, wherein the energy state of the rare earth ion of the first type is raised in energy from the ground state level to a higher level, namely the first level, by means of absorption of incident excitation light which has energy in the wavelength range which corresponds to a range in which the rare earth ion of the first type absorbs energy, wherein the energy from the rare earth ion of the first type is lowered from the first level to a lower level, namely the second level, by means of non-radiative phonon emission, wherein the rare earth ion of the first type radiates energy in the form of light thus lowering the energy level of the rare earth ion of the first type from the second level to a lower level, namely the terminal level, wherein energy transfer occurs from the terminal level of the rare earth ion of the first type to a level of the rare earth ion of the second type, namely the fourth level, and wherein non-radiative phonon transition occurs from the fourth level to the ground state level.

Another rare earth ion doped optical fiber element according to the present invention comprises an optical material which includes a high refractive index area and a low refractive index area surrounding the high refractive index area and which is doped with a rare earth ion of a first type, a rare earth ion of a second type and a rare earth ion of a third type in the high refractive index area, wherein the energy state of the rare earth ion of the third type is raised in energy from the ground state level to a higher level, namely the first level, by means of absorption of incident excitation light which has energy in the wavelength range which corresponds to a range in which the rare earth ion of the third type absorbs energy, wherein energy transfer occurs from the first level of the rare earth ion of the third type to a level of the rare earth ion of the first type, namely the second level, wherein the energy from the rare earth ion of the first type is lowered from the second level to a lower level, namely the third level, by means of non-radiative phonon emission, wherein the rare earth ion of the first type radiates energy in the form of light thus lowering the energy level of the rare earth ion of the first type from the third level to a lower lever, namely the terminal level, wherein energy transfer occurs from the terminal level of the rare earth ion of the first type to a level of the rare earth ion of the second type, namely the fifth level, and wherein non-radiative phonon transition occurs from the fifth level to the ground state level.

A rare earth ion doped laser element according to the present invention comprises an optical material which includes incident and emitting portions forming an optical resonator and which is doped with a rare earth ion of a first type and a rare earth ion of a second type, wherein the energy state of the rare earth ion of the first type is raised in energy from the ground state level to a higher level, namely the first level, by means of absorption of incident excitation light which has energy in the wavelength range which corresponds to a range in which the rare earth ion of the first type absorbs energy and which is incident through the incident portion, wherein the energy from the rare earth ion of the first type is lowered from the first level to a lower level, namely the second level, by means of non-radiative phonon emission, wherein the rare earth ion of the first type emits from the emitting portion light which corresponds to an energy difference between the second level and a lower level, namely the terminal level, while causing population inversion between the second level and the terminal level, wherein energy transfer occurs from the terminal level of the rare earth ion of the first type to a level of the rare earth ion of the second type, namely the fourth level, and wherein non-radiative phonon transition occurs from the fourth level to the ground state level.

Another rare earth ion doped laser element according to the present invention comprises an optical material which includes incident and emitting portions forming an optical resonator and which is doped with a rare earth ion of a first type and a rare earth ion of a second type, wherein the energy state of the rare earth ion of the first type is raised in energy from the ground state level to a higher level, namely the first level, by means of absorption of first incident excitation light which has energy in the wavelength range which corresponds to a range in which the rare earth ion of the first type absorbs energy and which is incident through the incident portion, and is raised in energy from the first level to a higher level, namely the second level, by means of absorption of second incident excitation light which has energy in the wavelength range which corresponds to a range in which the rare earth ion of the first type absorbs energy and which is incident through the incident portion, wherein the energy from the rare earth ion of the first type is lowered from the second level to a lower level, namely the third level, by means of non-radiative phonon emission, wherein the rare earth ion of the first type emits from the emitting portion light which corresponds to an energy difference between the third level and a lower level, namely the terminal level, while causing population inversion between the third level and the terminal level, wherein energy transfer occurs from the terminal level of the rare earth ion of the first type to a level of the rare earth ion of the second type, namely the fifth level, and wherein non-radiative phonon transition occurs from the fifth level to the ground state level.

A rare earth ion doped optical amplifying element according to the present invention comprises an optical material which includes incident and emitting portions and which is doped with a rare earth ion of a first type and a rare earth ion of a second type, wherein the energy state of the rare earth ion of the first type is raised in energy from the ground state level to a higher level, namely the first level, by means of absorption of incident excitation light which has energy in the wavelength range which corresponds to a range in which the rare earth ion of the first type absorbs energy and which is incident through the incident portion, wherein the energy from the rare earth ion of the first type is lowered from the first level to a lower level, namely the second level, by means of non-radiative phonon emission, wherein the rare earth ion of the first type radiates energy so as to amplify signal light incident through the incident portion and emit the same from the emitting portion thus lowering the energy level of the rare earth ion of the first type from the second level to a lower level, namely the terminal level, wherein energy transfer occurs from the terminal level of the rare earth ion of the first type to a level of the rare earth ion of the second type, namely the fourth level, and wherein non-radiative phonon transition occurs from the fourth level to the ground state level.

Another rare earth ion doped optical amplifying element according to the present invention comprises an optical material which includes incident and emitting portions and which is doped with a rare earth ion of a first type, a rare earth ion of a second type and a rare earth ion of a third type, wherein the energy state of the rare earth ion of the third type is raised in energy from the ground state level to a higher level, namely the first level, by means of absorption of incident excitation light which has energy in the wavelength range which corresponds to a range in which the rare earth ion of the third type absorbs energy, wherein energy transfer occurs from the first level of the rare earth ion of the third type to a level of the rare earth ion of the first type, namely the second level, wherein the energy from the rare earth ion of the first type is lowered from the second level to a lower level, namely the third level, by means of non-radiative phonon emission, wherein the rare earth ion of the first type radiates energy so as to amplify signal light incident through the incident portion and emit the same from the emitting portion thus lowering the energy level of the rare earth ion of the first type from the third level to a lower level, namely the terminal level, wherein energy transfer occurs from the terminal level of the rare earth ion of the first type to a level of the rare earth ion of the second type, namely the fifth level, and wherein non-radiative phonon transition occurs from the fifth level to the ground state level.

Examples of the optical element formed by doping the optical material with the rare earth ions are a laser element for causing light to resonate, and an optical amplifying element for amplifying light as a transferred wave. These optical elements utilize light which is radiated when the energy state of the rare earth ion is shifted to the high energy level by absorbing excitation light and is then shifted from the high energy level to the low energy level.

The energy state of the excited rare earth ion is shifted from the ground state energy level to the high energy level in principle. On the other hand, the energy state of the rare earth ion which radiates light stops at the terminal energy level higher than the ground state energy level. If the fluorescence lifetime of the medium energy level is long, ion population at the ground state energy level is relatively lowered so that the efficiency of transition to the high energy level caused by the excitation light is lowered. Consequently, it is difficult to apply to the optical element the rare earth ion having the long fluorescence lifetime of the terminal energy level.

According to the present invention, the optical material is doped with the rare earth ion of the first type (hereinafter referred to as the first rare earth ion) and the rare earth ion of the second type (hereinafter referred to as the second rare earth ion) having the energy level which is almost equal to the terminal energy level of the first rare earth ion, i.e., the first energy level. Consequently, the second rare earth ion emits phonon so that transition from the terminal energy level to the ground state energy level is promoted, which is caused by the mechanism of energy transfer. The energy transfer is a phenomenon in which spatial energy distribution of the first rare earth ion overlaps with that of the second rare earth ion so as to transfer energy from the first rare earth ion to the second rare earth ion.

When the energy level of the first rare earth ion is almost equal to that of the second rare earth ion, a transfer efficiency is the highest. If the absolute value of an energy difference is 1000 cm$^{-1}$ or less, the energy transfer takes place.

As described above, the energy level of the second rare earth ion is almost equal to the terminal energy level of the first rare earth ion. Consequently, energy is transferred from the first rare earth ion to the second rare earth ion. Phonon emission takes place much more quickly than light radiation. Consequently, the effective rate of deactivation from the terminal energy level to the ground state energy level is increased. As a result, the distribution of the rare earth ions at the ground state energy level is increased. Thus, light radiation and the efficiency of output light to input light can be improved.

In the case where the optical material is doped with the third rare earth ion which is excellent in excitation light absorption, the third rare earth ion is excited so that its absorption, the third rare earth ion is excited so that its energy state is shifted to the high energy level. Then, energy transfer takes place between the first and third rare earth ions. Thus, the light radiation and efficiency can further be enhanced.

This and other objects, features and advantages of the present invention will become more apparent upon a reading of the following detailed description and drawings.

DETAILED DESCRIPTION OF THE PREFERRED EMBODIMENT

Preferred embodiments of the present invention will be described with reference to the drawings.

Figure 1:
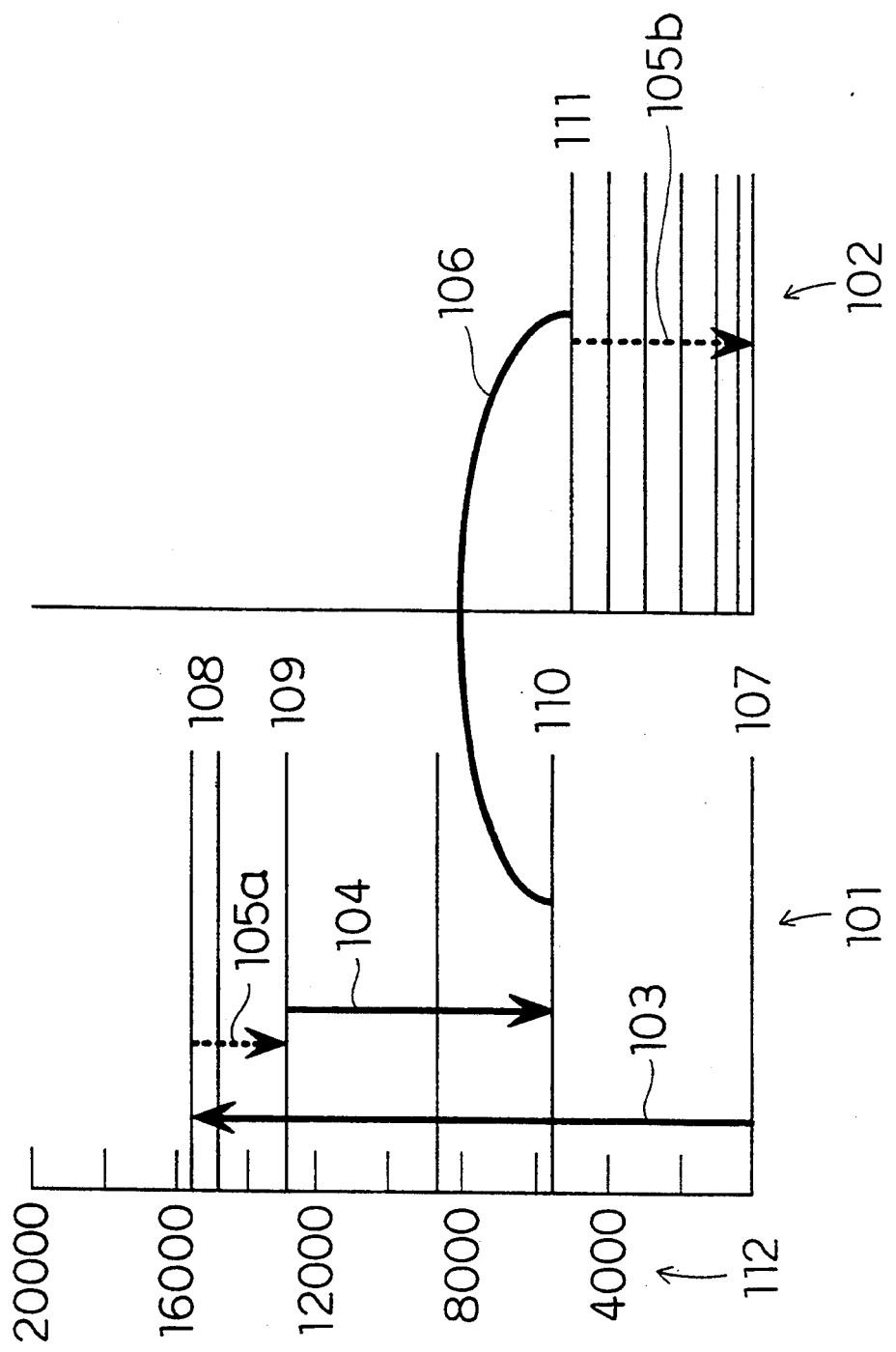
FIG. 1 is a view showing the energy level transition of rare earth ions in a rare earth ion doped solid state optical element according to a first embodiment of the present invention.

FIG. 1 is a view showing the energy level transition of rare earth ion of a first type (hereinafter referred to as a first rare earth ion) and rare earth ion of a second type (hereinafter referred to as a second rare earth ion) in a rare earth ion doped solid state optical element according to a first embodiment of the present invention. In FIG. 1, the reference numeral 101 denotes the energy level of Tm (thulium) ion as a first rare earth rare earth ion with which an optical material comprised of $YLiF_4$ is doped, the reference numeral 102 denotes the energy level of Eu (Europium) ion as a second rare earth ion with which the optical material is doped, the reference numeral 103 denotes transition caused by absorbing excitation energy from a pump laser, the reference numeral 104 denotes level transition caused by light radiation, the reference numerals 105a and 105b denote level transition caused by phonon emission, and the reference numeral 106 denotes energy transfer. An axis of ordinates 112 denotes energy with a unit of $cm^{-1}$ (kayser).

The rare earth ion doped solid state optical element according to the first embodiment is formed by optically polishing both end faces of a laser crystal comprised of the optical material which is doped with 30 to 5000 ppm (30 to 5000 parts per million) of Tm ion and 30 to 5000 ppm of Eu ion. The rare earth ion doped solid state optical element has a width of 10 mm, a height of 10 mm and a length of 50 mm.

When light having a wavelength of 650 to 680 nm emitted from a dye laser or a semiconductor laser is incident as excitation light through one of the end faces of the solid state optical element, the energy state of the Tm ion is raised from the ground state energy level 107, i.e., $^3H_6$ level to a high energy level 108, i.e., $^3F_3$ or $^3F_2$ level as shown in the level transition 103. Then, the energy state of the Tm ion is lowered from the level 108 to a level 109, i.e., $^3F_4$ level by phonon emission as shown in the level transition 105a. Thereafter, the energy state of the Tm ion is shifted from the level 109 to a level 110, i.e., $^3H_4$ level by light radiation as shown in the level transition 104. The level 110 is referred to as the terminal energy level. The energy transfer 106 takes place between the Tm and Eu ions. The energy state of the Eu ion is shifted from a level 111, i.e., $^7F_6$ level to a ground state energy level 107, i.e., $^7F_0$ level by phonon emission as shown in the level transition 105b.

In the case where the solid state optical element is doped with only the Tm ion, the energy level reaches the terminal energy level 110, i.e., $^3H_4$ level. Since the fluorescence lifetime of the level 110 is long on the order of 10 ms, ion population at the level 107 is decreased. Consequently, the amount of ions that have transition from the level 109, $^3F_4$ level to the level 110, i.e., $^3H_4$ level is decreased. Therefore, the transition by absorption of the pump light 103 is decreased. Thus, light radiation is reduced. Referring to the solid state optical element according to the first embodiment, the energy transfer takes place between the Tm and Eu ions so that the energy state is then lowered by fast phonon emission from the level 111 to the level 107. Consequently, the ion population at the level 107 is increased so that light radiation is increased.

Figure 2:
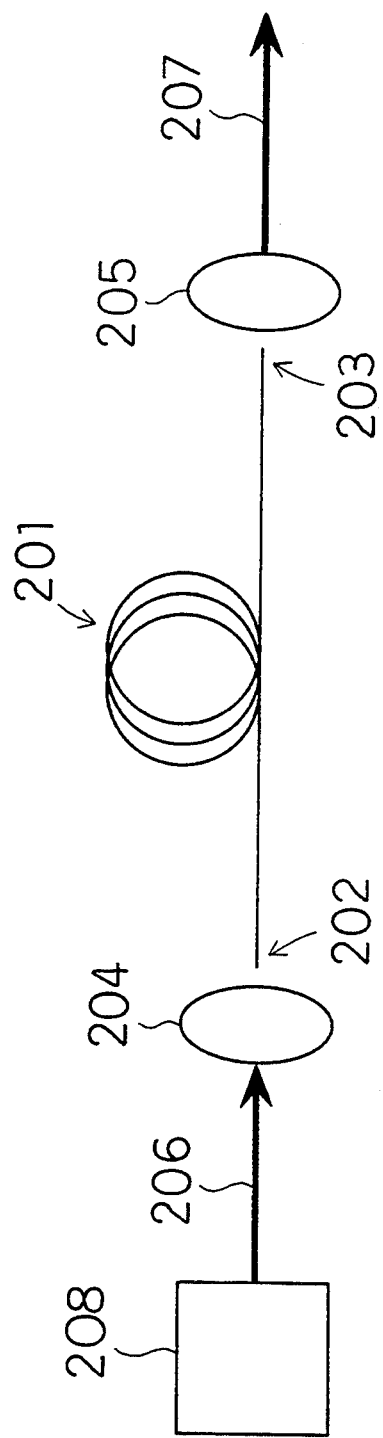
FIG. 2 is a view illustrating the structure of a rare earth ion doped optical fiber element according to a second embodiment of the present invention.

There will be described a rare earth ion doped optical fiber element according to a second embodiment of the present invention with reference to FIG. 2. In FIG. 2, the reference numeral 201 denotes an optical fiber, the reference numeral 202 denotes an incident portion of the optical fiber 201, the reference numeral 203 denotes an emitting portion of the optical fiber 201, the reference numeral 204 denotes an incident lens, the reference numeral 205 denotes an emitting lens, the reference numeral 206 denotes excitation light, the reference numeral 207 denotes emitted light, and the reference numeral 208 denotes a pump laser.

The optical fiber has a core in which a refractive index is optically high, and a clad in which the refractive index is optically low. When a difference in refractive index between the core and the clad is 0.001 to 0.01, the excitation light is propagated in a single mode so that there exists high optical power density of the excitation light within the core of the fiber. According to the second embodiment, the fluoride optical fiber is doped with 500 to 5000 ppm of Tm ion as a first rare earth ion and 500 to 10000 ppm of Eu ion as a second rare earth ion, forming the core of the fluoride optical fiber 201 which has a core diameter of 10 μm, a clad diameter of 125 μm and a length of up to 10 m.

The excitation light 206 emitted from the pump laser 208 is incident from the incident lens 204 onto the optical fiber 201 through the incident portion 202. The light passing through the optical fiber 201 is emitted from the emitting portion 203, is changed into parallel light by the emitting lens 205 and becomes emitted light 207. The power density of the excitation light in the core is held over a long distance so that the rare earth ion can efficiently absorb the excitation light. Since the optical fiber has an outline dimension of 1 mm or less, it is small-sized, light and flexible. Consequently, the optical fiber can be applied to various limited spaces.

Referring to the optical fiber element according to the second embodiment, when energy transfer takes place between the Tm and Eu ions, the energy state is shifted from the terminal energy level to a ground state energy level in similar to the solid state optical element according to the first embodiment. Consequently, ion population at the ground state energy level is increased so that the absorption of the excitation light is increased. As a result, light radiation is increased so that light is radiated according to the intensity of the excitation light.

Figure 3:
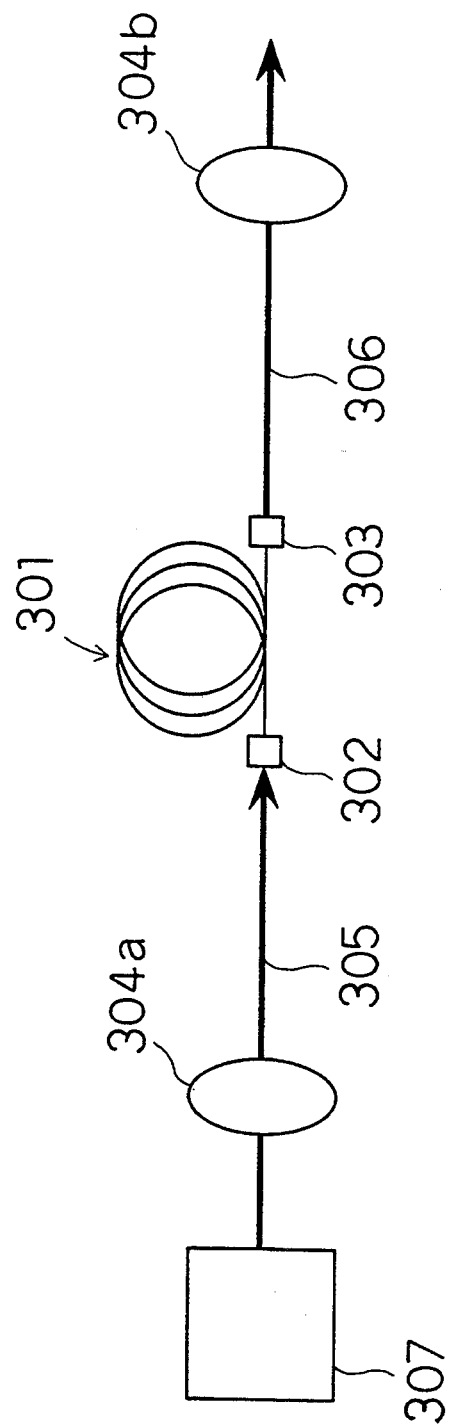
FIG. 3 is a view illustrating the structure of a rare earth ion doped laser element according to a third embodiment of the present invention.

There will be described a rare earth ion doped laser element according to a third embodiment of the present invention with reference to FIGS. 3 to 5. In FIG. 3, the reference numeral 301 denotes an optical fiber formed by doping a fluoride optical material with Tm ion as a first rare earth ion and Eu ion as a second rare earth ion, the reference numeral 302 denotes an incident portion of the optical fiber 301, the reference numeral 303 denotes an emitting portion of the optical fiber 301, the reference numeral 304a denotes an incident lens, the reference numeral 304b denotes an emitting lens, the reference numeral 305 denotes excitation light, the reference numeral 306 denotes a laser beam, and the reference numeral 307 denotes a pump laser.

Referring to the third embodiment, a multilayer film is provided on one of the end faces of the optical fiber 301, i.e., the incident portion 302. The optical fiber 301 is formed by doping the optical material with 100 to 5000 ppm of Tm ion and 1000 to 10,000 ppm of Eu ion. The multilayer film is highly transparent for light having a wavelength of 780 nm and highly reflective for light having a wavelength of 1500 nm. A multilayer film is provided on the other end face of the optical fiber 301, i.e., the emitting portion 303. The multilayer film is highly reflective for light having a wavelength of 780 nm and has a transmission of 0.1 to 10% for light having a wavelength of 1500 nm. When the excitation light 305 emitted from the pump laser 307 at a wavelength of 780 nm is converged by the incident lens 304a and incident on the optical fiber 301, energy is absorbed by the Tm ion in the optical fiber 301.

Figure 4:
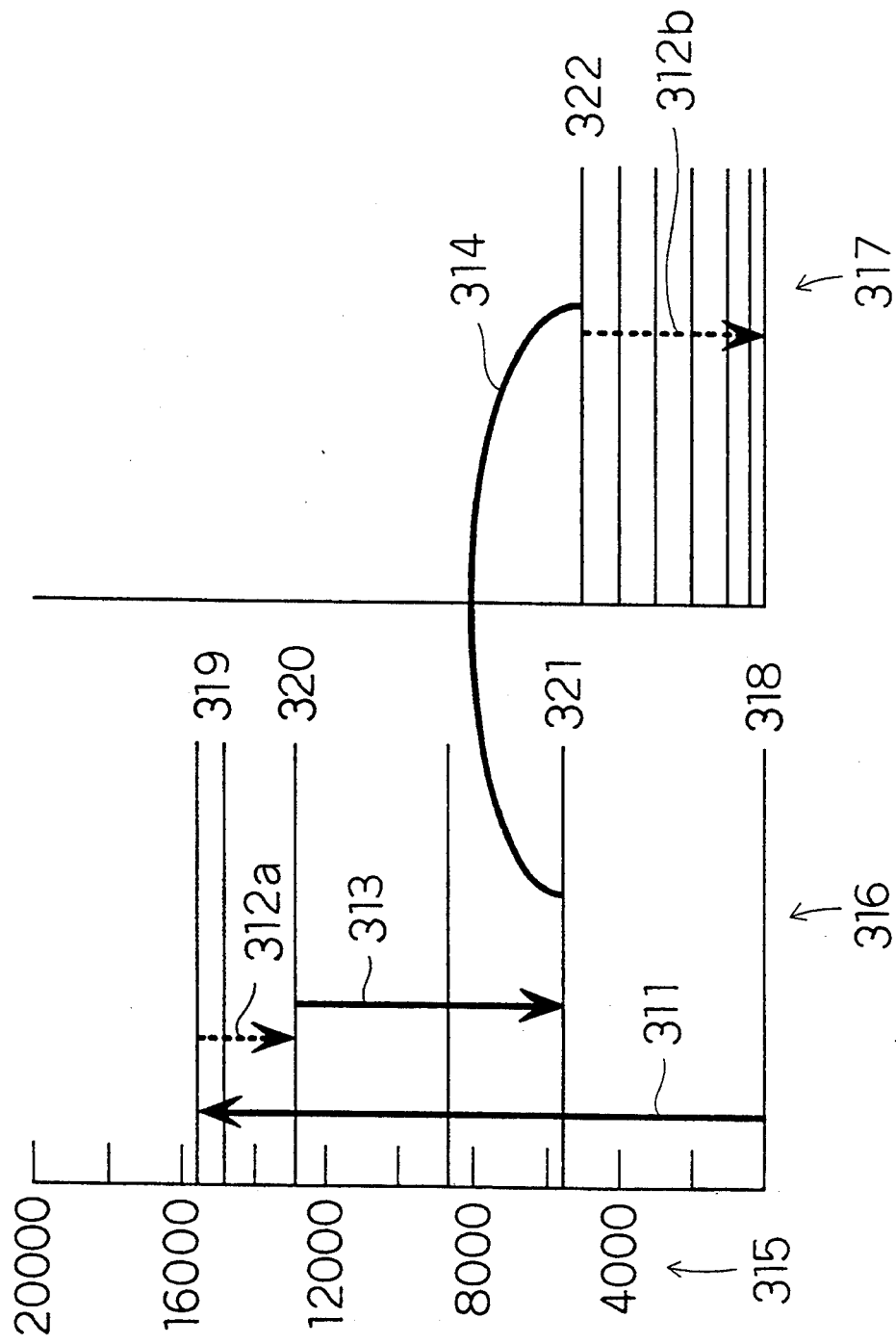
FIG. 4 is a view showing the energy level transition of rare earth ions with which an optical material of the laser element is doped according to the third embodiment of the present invention.

FIG. 4 is a view showing the energy level transition of rare earth ions with which the laser element is doped according to the third embodiment of the present invention. In FIG. 4, the reference numeral 316 denotes the energy level transition of Tm ion, the reference numeral 317 denotes the energy level transition of Eu ion, the reference numeral 311 denotes level transition caused by absorbing excitation energy from the pump laser 307, the reference numerals 312a and 312b denote level transition caused by phonon emission, the reference numeral 313 denotes level transition caused by light radiation, the reference numeral 314 denotes energy transfer, an axis of ordinates 315 denotes energy with a unit of cm$^{-1}$, and the reference numerals 318, 319, 320, 321 and 322 denote energy levels.

When light having a wavelength of 650 to 780 nm is incident as excitation light from the incident portion 302, the energy state of the Tm ion is shifted from the ground state energy level 318 to the high energy level 319 as shown in the level transition 311. Then, the energy state of the Tm ion is shifted from the level 319 to the level 320 by phonon emission as shown in the level transition 312a. Thereafter, the energy state of the Tm ion is shifted from the level 320 to the level 321 as shown in the level transition 313. When the level transition 313 is carried out, light having a wavelength of 1500 nm is radiated by the Tm ion. The energy transfer 314 takes place between the Tm and Eu ions. Consequently, the energy state of the Eu ion is shifted from the level 322 to the level 318 by phonon emission as shown in the level transition 312b.

The light radiated by the level transition from the level 320 to the level 321 is caused to resonate by reflecting films provided on the incident portion 302 and emitting portion 303 of the optical fiber 301, and is then amplified. Thereafter, population inversion occurs between the levels 320 and 321, and the light thus amplified is emitted as a laser beam from the emitting portion 303. The laser beam emitted from the emitting portion 303 of the optical fiber 301 is changed into parallel light by the emitting lens 304b, and is then outputted.

In the case where the laser element is doped with only the Tm ion, the fluorescence lifetime of the level 321 is very long on the order of 10 ms and there is an energy difference of 5000 cm$^{-1}$ or more between the levels 321 and 318. Consequently, the probability of phonon emission is very low so that ion population at the level 318 is decreased. Referring to the laser element according to the third embodiment, with the Tm and Eu ions is doped the optical material forming the optical fiber 301. Consequently, energy transfer takes place between the Tm and Eu ions. Then, phonon emission in which the energy state is shifted very quickly is carried out by the Eu ion having multiple levels between the level 318 and the level 322 having an energy difference of 6000 cm$^{-1}$ with respect thereto. As a result, the energy state is rapidly shifted from the level 322 to the level 318. Consequently, population inversion can efficiently be carried out between the high energy level 320 and the medium energy level 321. Referring to the laser element according to the prior art, the efficiency of the emitted light to the incident light is 13%. Referring to the laser element according to the third embodiment, the efficiency of the emitted light to the incident light is 30%. Thus, there can be obtained a laser element having a high efficiency.

Figure 5:
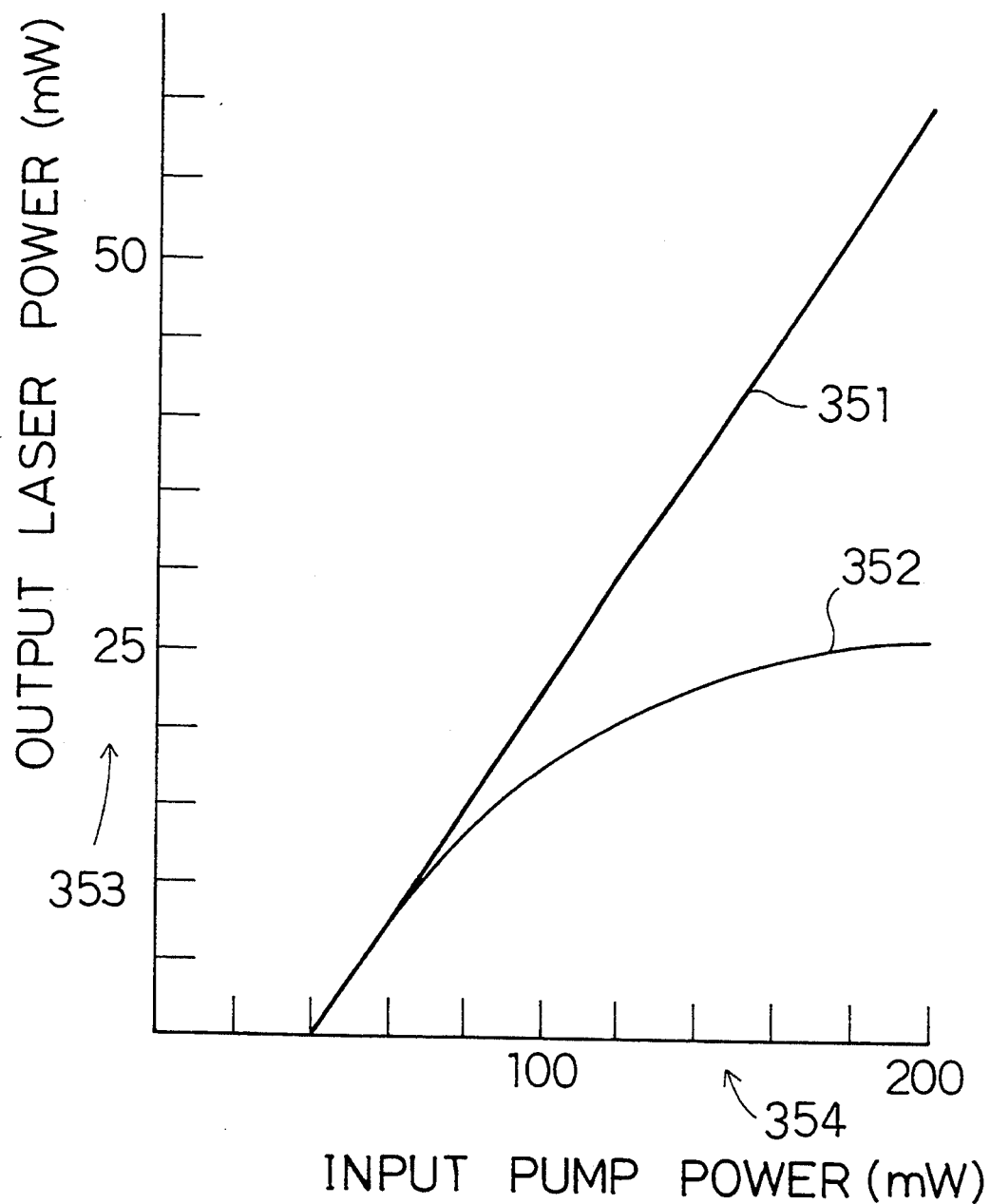
FIG. 5 is a view showing the light output characteristics of the rare earth ion doped laser element according to the third embodiment of the present invention.

FIG. 5 is a view showing the output characteristics of the rare earth ion doped laser element according to the third embodiment of the present invention. In FIG. 5, the reference numeral 351 denotes output characteristics for the input pump power of the laser element according to the third embodiment, and the reference numeral 352 denotes output characteristics for the input pump power of a single ion doped laser element according to the prior art. In FIG. 5, an axis of ordinates 353 denotes an output laser power with a unit of mW, and an axis of abscissas 354 denotes an input pump power with a unit of mW. As apparent from FIG. 5, even if the input pump power of the rare earth ion doped laser element according to the third embodiment is increased by the above-mentioned function and effect, the output laser power is not saturated. Consequently, high output can be obtained.

Figure 6:
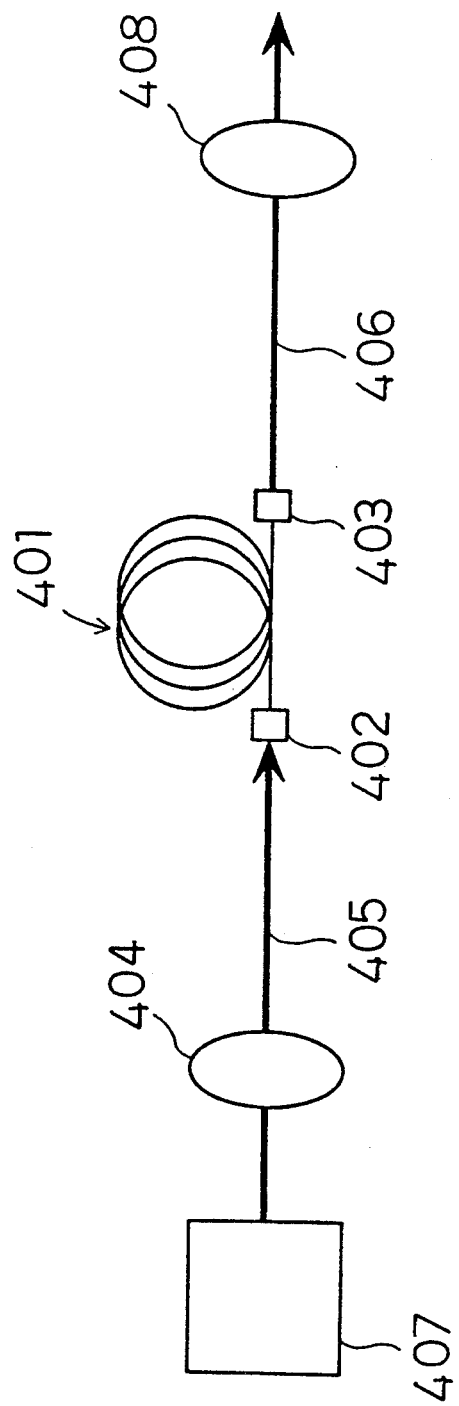
FIG. 6 is a view illustrating the structure of a rare earth ion doped laser element according to a fourth embodiment of the present invention.

There will be described a rare earth ion doped laser element according to a fourth embodiment of the present invention with reference to FIGS. 6 and 7. FIG. 6 shows the structure of the rare earth ion doped laser element according to the fourth embodiment. In FIG. 6, the reference numeral 401 denotes an optical fiber formed by doping a fluoride optical material with Tm ion as a first rare earth ion and Eu ion as a second rare earth ion, the reference numeral 402 denotes an incident portion of the optical fiber 401, the reference numeral 403 denotes an emitting portion of the optical fiber 401, the reference numeral 404 denotes an incident lens, the reference numeral 405 denotes excitation light, the reference numeral 406 denotes a laser beam, the reference numeral 407 denotes a pump laser, and the reference numeral 408 denotes an emitting lens.

Referring to the fourth embodiment, a multilayer film is provided on one of the end faces of the optical fiber 401, i.e., the incident portion 402. The optical fiber 401 is formed by doping the optical material with 100 to 5000 ppm of Tm ion and 1000 and 10000 ppm of Eu ion. The multilayer film is highly transparent for light having a wavelength of 650 nm and highly reflective for light having a wavelength of 450 nm. A multilayer film is provided on the other end face of the optical fiber 401, i.e., the emitting portion 403. The multilayer film is highly reflective for light having a wavelength of 650 nm and has a transmission of 1 to 10% for light having a wavelength of 450 nm. When the excitation light 405 emitted from the pump laser 407 at a wavelength of 650 nm is converged by the incident lens 404 and incident on the optical fiber 401, energy is absorbed by the Tm ion in the optical fiber 401.

Figure 7:
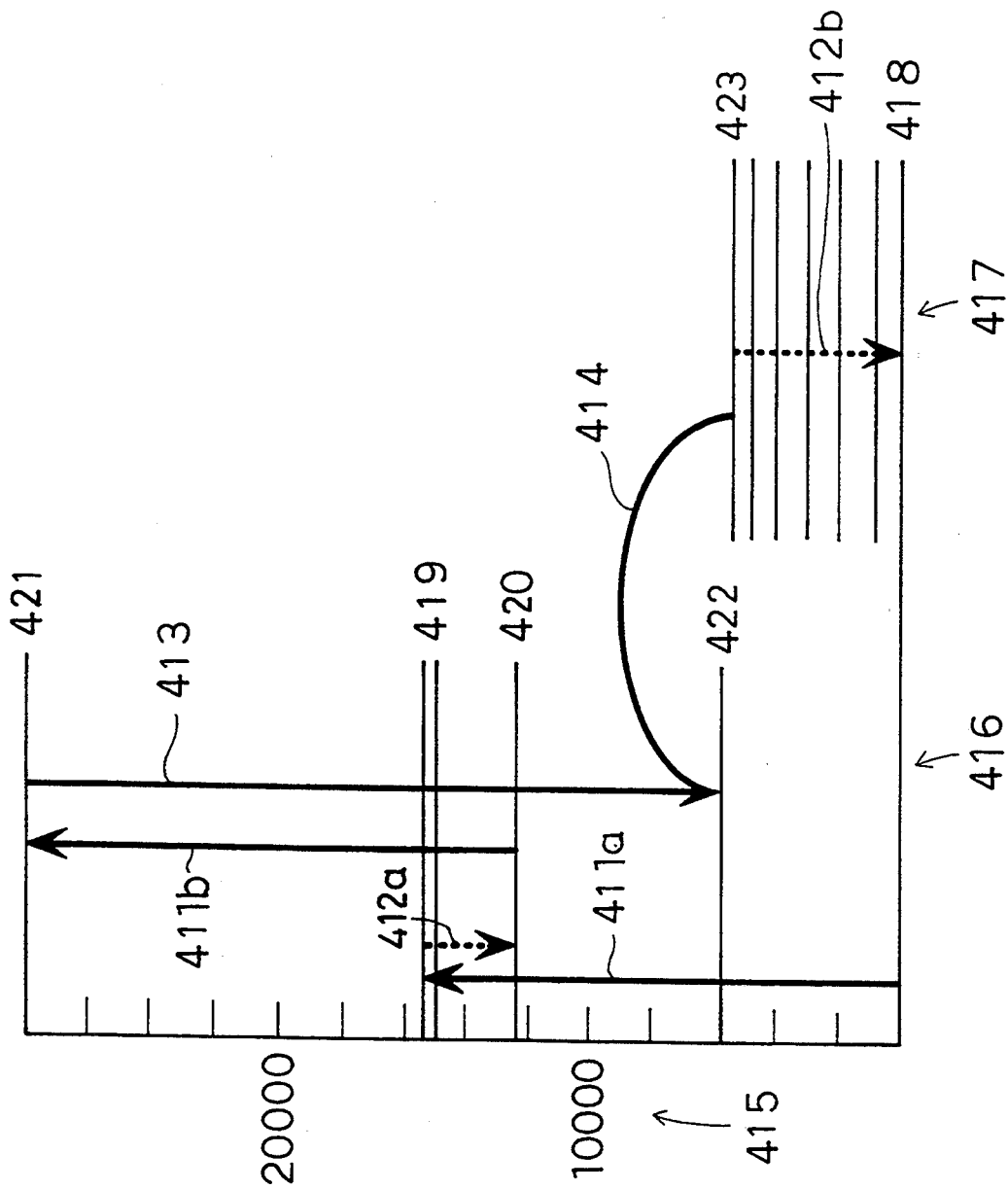
FIG. 7 is a view showing the energy level transition of rare earth ions with which an optical material of the laser element is doped according to the fourth embodiment of the present invention.

FIG. 7 is a view showing the energy level transition of Tm and Eu ions with which the laser element is doped according to the fourth embodiment of the present invention. In FIG. 7, the reference numeral 416 denotes the energy level transition of the Tm ion, the reference numeral 417 denotes the energy level transition of the Eu ion, the reference numerals 411$d$ $a$ and 411$b$ denote level transition to a high level caused by absorbing excitation light, the reference numerals 412$a$ and 412$b$ denote level transition caused by phonon emission, the reference numeral 413 denotes level transition caused by light radiation, the reference numeral 414 denotes level transition caused by energy transfer, an axis of ordinates 415 denotes energy with a unit of cm$^{-1}$, and the reference numerals 418, 419, 420, 421, 422 and 423 denote energy levels.

The energy state of the Tm ion is shifted from the ground state energy level 418 to the level 419 by absorbing the excitation light having a wavelength of 650 nm as shown in the level transition 411$a$. Then, the energy state of the Tm ion is shifted to the level 420 by phonon emission as shown in the level transition 412$a$. Thereafter, the energy state of the Tm ion is shifted from the level 420 to the high energy level 421 by absorbing the same excitation light as shown in the level transition 411$b$. Thus, the energy state of ions is shifted to an energy level higher than the energy level of the excitation light by two kinds of energy absorption, which is called "up conversion". The energy state is shifted from the level 418 to the level 421 by the up conversion, and is then shifted from the level 421 to the level 422 by light radiation as shown in the level transition 413. Consequently, light having a wavelength of 450 nm is radiated. The light thus radiated is caused to resonate by reflecting films provided on the incident portion 402 and the emitting portion 403, and is then amplified. The population inversion takes place between levels 421 and 422. The light thus amplified is emitted as a laser beam from the emitting portion 403.

As described above, in the case where the laser element is doped with only the Tm ion, ion population at the ground state energy level 418 is decreased. According to the fourth embodiment, the optical fiber 401 is doped with the Tm and Eu ions so that energy transfer takes place between the Tm and Eu ions. Then, phonon emission in which the energy state is shifted very quickly is carried out by the Eu ion having multiple levels between the level 418 and the level 423 having an energy difference of 6000 cm$^{-1}$ with respect thereto, so that the energy state is rapidly shifted from the level 423 to the level 418. Consequently, population inversion can efficiently be carried out between the high energy level 421 and the terminal energy level 422.

Figure 8:
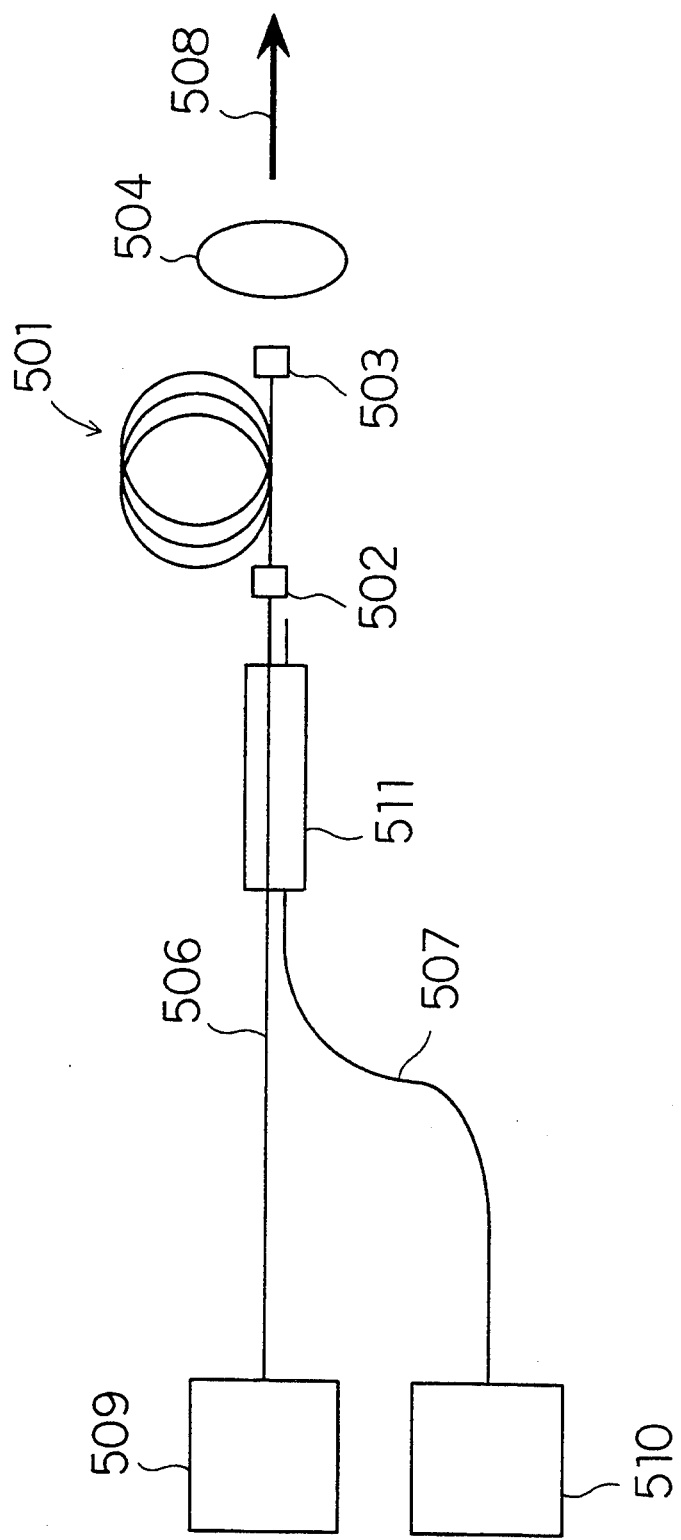
FIG. 8 is a view illustrating the structure of a rare earth ion doped laser element according to a fifth embodiment of the present invention.

There will be described a rare earth ion doped laser element according to a fifth embodiment of the present invention with reference to FIG. 8. Referring to the fourth embodiment, the energy state is shifted to the level 421 by the up conversion in which the same excitation light is used. Referring to the fifth embodiment, excitation light having different wavelengths is used. In FIG. 8, the reference numeral 501 denotes an optical fiber forming a rare earth ion doped laser element, the reference numeral 502 denotes an incident portion of the optical fiber 501, the reference numeral 503 denotes an emitting portion of the optical fiber 501, the reference numeral 504 denotes an emitting lens, the reference numeral 506 denotes a fiber for first excitation light propagated in a single mode, the reference numeral 507 denotes a fiber for second excitation light propagated in a single mode, the reference numeral 508 denotes emitted light, the reference numeral 509 denotes a pump laser for the first excitation light, the reference numeral 510 denotes a pump laser for the second excitation light, and the reference numeral 511 denotes an optical fiber coupler. The energy level transition according to the fifth embodiment is the same as in FIG. 7. According to the fifth embodiment, the rare earth ion at the level 420 is directly excited by excitation light having a wavelength of 780 nm. Consequently, the level transition from the level 420 to the level 421 can be carried out more efficiently.

There will be described a rear earth ion doped optical amplifying element according to a sixth embodiment of the present invention with reference to FIGS. 9 and 10.

Figure 9:
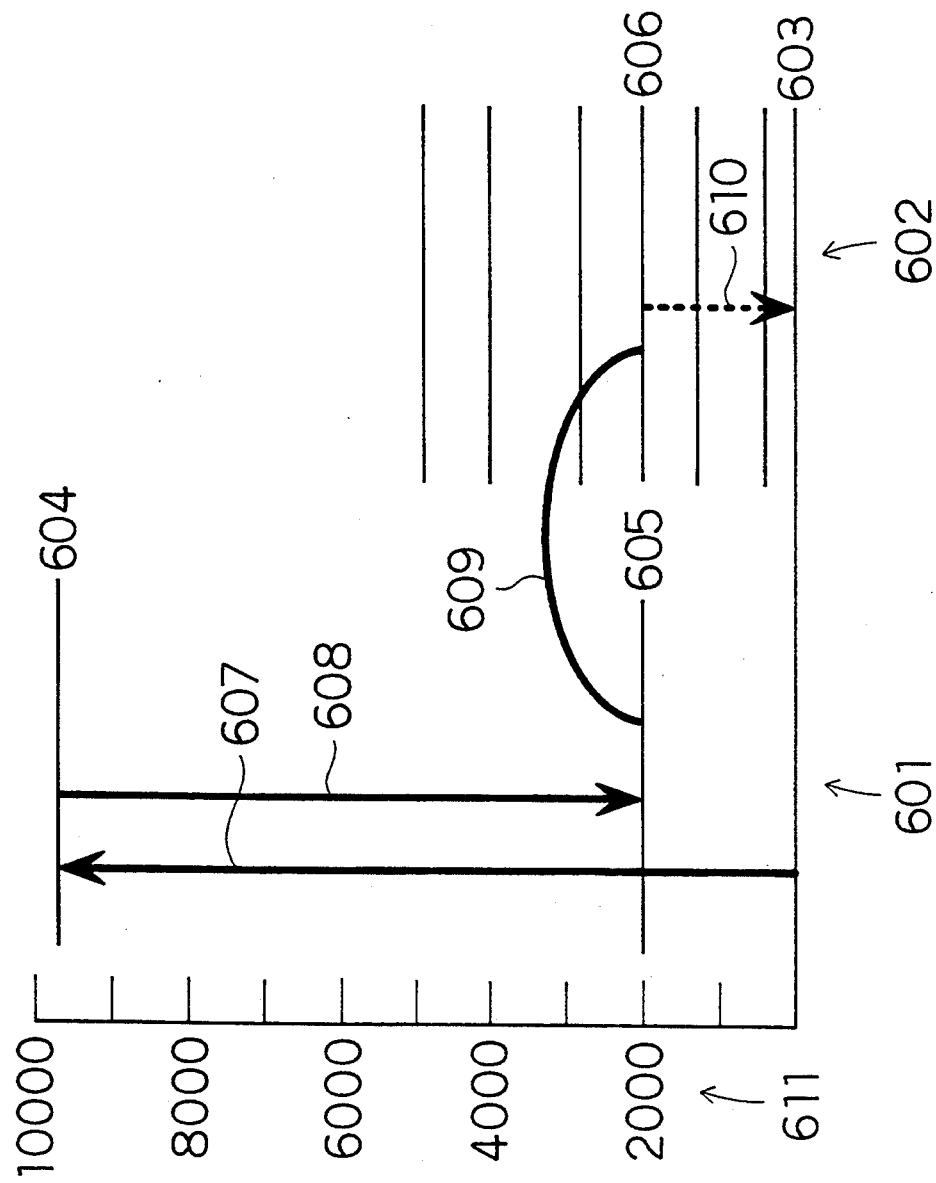
FIG. 9 is a view showing the energy level transition of rare earth ions with which an optical material of an optical amplifying element is doped according to a sixth embodiment of the present invention.

FIG. 9 is a view showing the energy level transition of rare earth ions with which an optical amplifying element is doped according to the sixth embodiment. FIG. 10 is a view illustrating the structure of the rare earth ion doped optical amplifying element according to the sixth embodiment.

In FIG. 9, the reference numeral 601 denotes the energy level transition of Pr (Praseodymium) ion as a first rare earth ion with which the optical amplifying element comprised of a fluoride optical material is doped, the reference numeral 602 denotes the energy level transition of Eu ion as a second rare earth ion with which the optical amplifying element is doped, the reference numeral 603 denotes a ground state energy level, the reference numerals 604, 605 and 606 denote energy levels, the reference numeral 607 denotes level transition caused by excitation light, the reference numeral 608 denotes level transition caused by light radiation, the reference numeral 609 denotes level transition caused by energy transfer, and the reference numeral 610 denotes level transition caused by phonon emission. An axis of ordinates 611 denotes energy with a unit of $cm^{-1}$.

Figure 10:
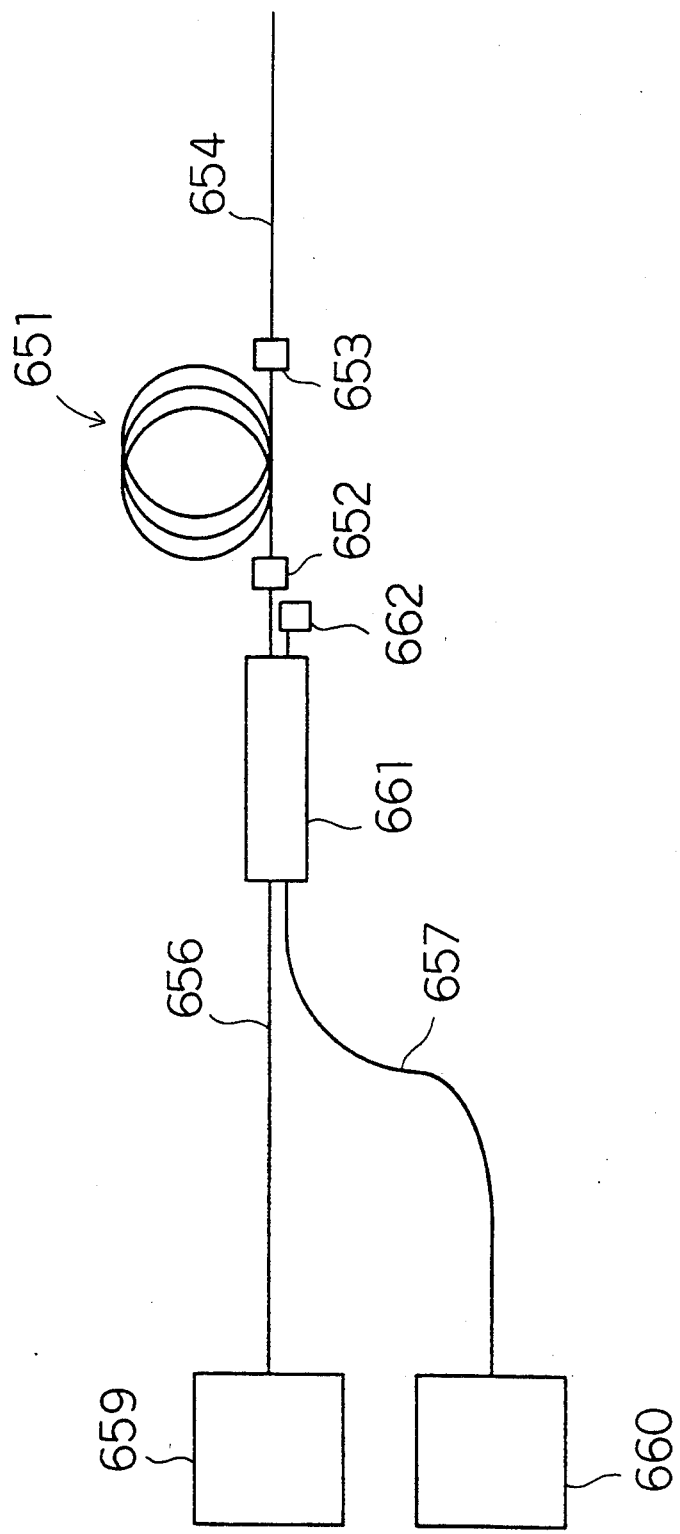
FIG. 10 is a view illustrating the structure of the rare earth ion doped optical amplifying element according to the sixth embodiment of the present invention.

In FIG. 10, the reference numeral 651 denotes an optical fiber forming the rare earth ion doped optical amplifying element, the reference numeral 652 denotes an incident portion of the optical fiber 651, the reference numeral 653 denotes an emitting portion of the optical fiber 651, the reference numeral 654 denotes an optical fiber for propagating output signal light in a single mode, the reference numeral 656 denotes an optical fiber for propagating input signal light in a single mode, the reference numeral 657 denotes an optical fiber for propagating excitation light in a single mode, the reference numeral 659 denotes a signal light source, the reference numeral 660 denotes a pump laser, the reference numeral 661 denotes an optical fiber coupler for coupling the signal light and the excitation light together, and the reference numeral 662 denotes a matching oil.

Excitation light having a wavelength of 1.017 $\mu$m is emitted from the pump laser 660 and is then incident through the incident portion 652 of the optical fiber 651 which is doped with 1000 to 5000 ppm of Pr ion and 1000 to 10,000 ppm of Eu ion. Signal light having a wavelength of 1.31 $\mu$m is simultaneously emitted from the signal light source 659 and is then incident through the optical fiber coupler 661. Consequently, the energy state of the Pr ion is shifted from the ground state energy level 603 to the high energy level 604 by absorbing the energy of the excitation light as shown in the level transition 607, and is then shifted from the level 604 to the medium energy level 605 by light radiation. Thereafter, the energy state is shifted from the level 605 of the Pr ion to the level 606 of the Eu ion by energy transfer as shown in the level transition 609, and is then shifted from the level 606 to the level 603 by phonon emission as shown in the level transition 610.

Referring to the optical amplifying element according to the prior art, in the case where the excitation light has a power of 925 mW, the amplification gain of the signal light is 30 dB. When the output laser power of the signal light exceeds 5 dBm (=3.16 mW), the gain is lowered. According to the sixth embodiment, there can be obtained a signal output laser power of 20 dBm (=100 mW) with a high gain of 30 dB.

Figure 11:
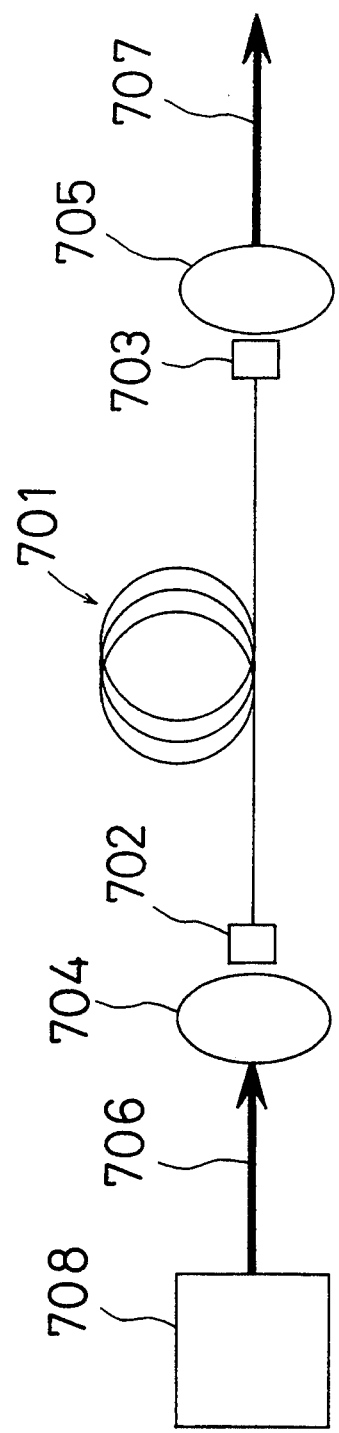
FIG. 11 is a view illustrating the structure of a rare earth ion doped optical fiber element according to a seventh embodiment of the present invention.

There will be described a rare earth ion doped optical fiber element according to a seventh embodiment of the present invention with reference to FIGS. 11 and 12. In FIG. 11, the reference numeral 701 denotes an optical fiber, the reference numeral 702 denotes an incident portion of the optical fiber 701, the reference numeral 703 denotes an emitting portion of the optical fiber 701, the reference numeral 704 denotes an incident lens, the reference numeral 705 denotes an emitting lens, the reference numeral 706 denotes excitation light, the reference numeral 707 denotes emitted light, and the reference numeral 708 denotes a pump laser.

Referring to the optical fiber, when a difference in refractive index between the core and the clad is 0.001 to 0.01, the excitation light is propagated in a single mode so that light reflection on the clad is good as described above. According to the seventh embodiment, with Pr ion as a first rare earth ion is doped an optical material forming the core of the fluoride optical fiber 701 which has a core diameter of 10 $\mu$m, a clad diameter of 125 $\mu$m and a length of 10 m ($ZrF_4$-$BaF_2$-$LaF_3$-$AlF_3$-NaF).

The excitation light 706 emitted from the pump laser 708 is incident from the incident lens 704 onto the optical fiber 701 through the incident portion 702. The light passing through the optical fiber 701 is emitted from the emitting portion 703, is changed into parallel light by the emitting lens 705 and becomes the emitted light 707. The power density of the excitation light in the core is high so that the rare earth ion can efficiently absorb the excitation light. Since the optical fiber 701 has an outline dimension of 1 mm or less, it is small-sized, light and flexible. Consequently, the optical fiber 701 can be applied to various limited spaces.

Figure 12:
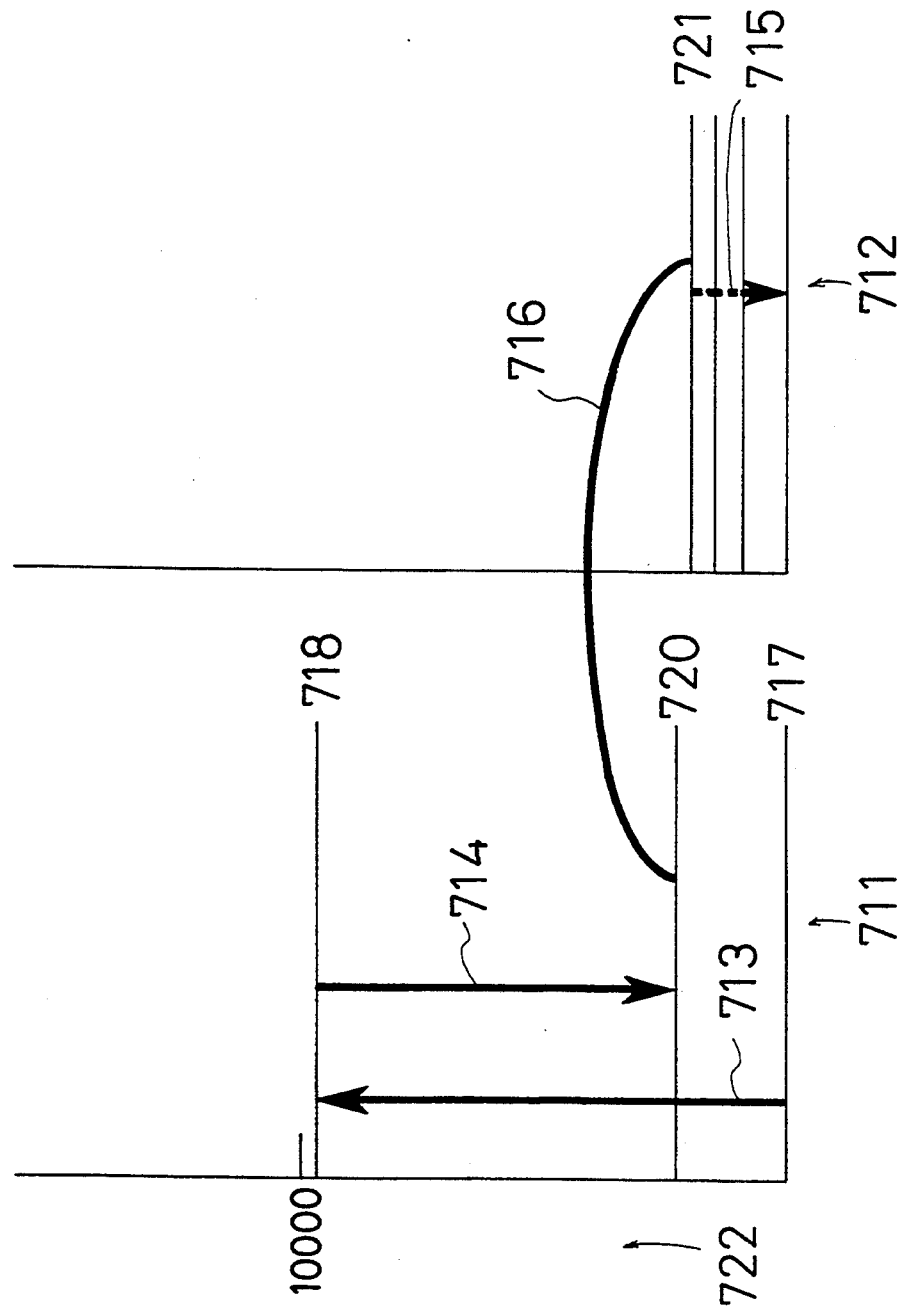
FIG. 12 is a view showing the energy level transition of rare earth ions with which an optical material of the optical fiber element is doped according to the seventh embodiment of the present invention.

FIG. 12 is a view showing the energy level transition of first and second rare earth ions with which the optical fiber element is doped according to the seventh embodiment of the present invention. In FIG. 12, the reference numeral 711 denotes the energy level transition of Pr ion as the first rare earth ion with which the optical material is doped, the reference numeral 712 denotes the energy level transition of Eu (Europium) ion as the second rare earth ion with which the optical material is doped, the reference numeral 713 denotes level transition caused by absorbing excitation energy from the pump laser, the reference numeral 714 denotes level transition caused by light radiation, the reference numeral 715 denotes level transition caused by phonon emission, the reference numeral 716 denotes energy transfer, an axis of ordinates 722 denotes energy with a unit of $cm^{-1}$ (kayser), and the reference numerals 717, 718, 720 and 721 denote energy levels.

The rare earth ion doped optical fiber element according to the seventh embodiment is formed by doping the optical material with 30 to 5000 ppm (30 to 5000/parts per million) of Pr ion and 30 to 5000 ppm of Eu ion. Both end faces of the optical fiber 701 formed by the optical material are optically polished.

When light having a wavelength of 1.017 μm which is emitted from a Ti: $Al_2O_3$ laser or a semiconductor laser is incident as excitation light through the incident portion 702 of the optical fiber 701, the energy state of the Pr ion is shifted from the ground state energy level 717, i.e., $^3H_4$ level to the high energy level 718, i.e., $^1G_4$ level as shown in the level transition 713. Then, the energy state of the Pr ion is shifted to the level 720, i.e., $^3H_5$ level by light radiation. The energy transfer 716 takes place between the Pr and Eu ions. Consequently, the energy state of the Eu ion is shifted from the level 721, i.e., $^7F_3$ level to a level 717, i.e., $^7F_0$ level by phonon emission as shown in the level transition 715.

As compared with an optical fiber element which is not doped with the Eu ion, the effect of the present invention becomes obvious. More specifically, in the case where the optical fiber element is doped with only the Pr ion, the energy state reaches the medium energy level 720, i.e., $^3H_5$ level. Since the fluorescence lifetime of the level 720 is long, ion population at the ground state energy level 717 is decreased. Consequently, there is lowered transition from the level 718, $^1G_4$ level to the level 720, i.e., $^3H_5$ level. Thus, light radiation is reduced. Referring to the optical fiber element according to the seventh embodiment, the energy transfer takes place between the Pr and Eu ions so that the energy state is shifted from the level 720 to the level 717. Consequently, the ion population at the level 717 is increased so that light radiation is increased.

Figure 13:
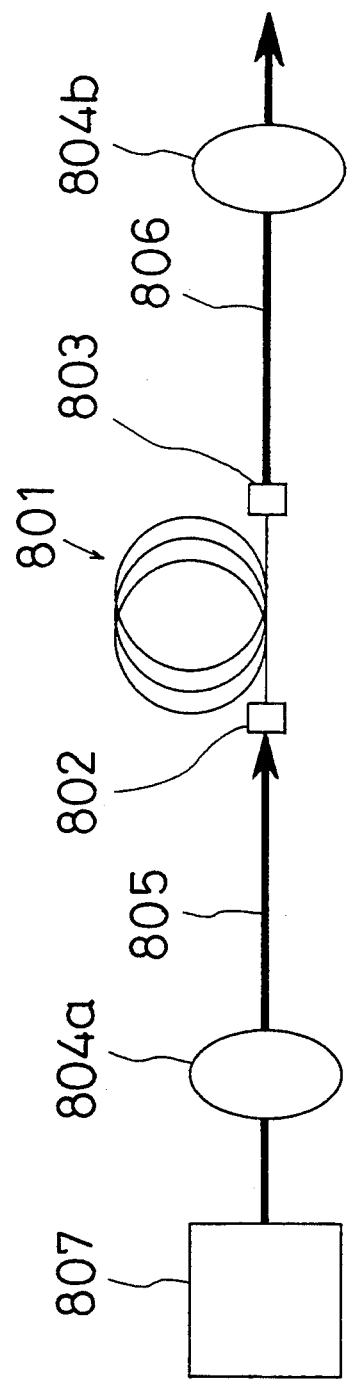
FIG. 13 is a view illustrating the structure of a rare earth ion doped laser element according to an eighth embodiment of the present invention.

There will be described a rare earth ion doped laser element according to an eighth embodiment of the present invention with reference to FIGS. 13 to 15. FIG. 13 shows the structure of the rare earth ion doped laser element according to the eighth embodiment. In FIG. 13, the reference numeral 801 denotes an optical fiber formed by doping a fluoride optical material with Pr ion as a first rare earth ion and Eu ion as a second rare earth ion, the reference numeral 802 denotes an incident portion of the optical fiber 801, the reference numeral 803 denotes an emitting portion of the optical fiber 801, the reference numeral 804a denotes an incident lens, the reference numeral 804b denotes an emitting lens, the reference numeral 805 denotes excitation light, the reference numeral 806 denotes a laser beam, and the reference numeral 807 denotes a pump laser.

Referring to the eighth embodiment, a multilayer film is provided on one of the end faces of the optical fiber 801, i.e., the incident portion 802. The optical fiber 801 is formed by doping the optical material with 100 to 5000 ppm of Pr ion and 1000 to 10,000 ppm of Eu ion. The multilayer film is highly transparent for light having a wavelength of 1.017 μm and highly reflective for light having a wavelength of 1.31 μm. A multilayer film is provided on the other end face of the optical fiber 801, i.e., the emitting portion 803. The multilayer film is highly reflective for light having a wavelength of 1.017 μm and has a transmission of 1 to 10% for light having a wavelength of 1.31 μm. When the excitation light 805 emitted from the pump laser 807 at a wavelength of 1.017 μm is converged by the incident lens 804a and is incident on the optical fiber 801, energy is absorbed by the Pr ion in the optical fiber 801.

Figure 14:
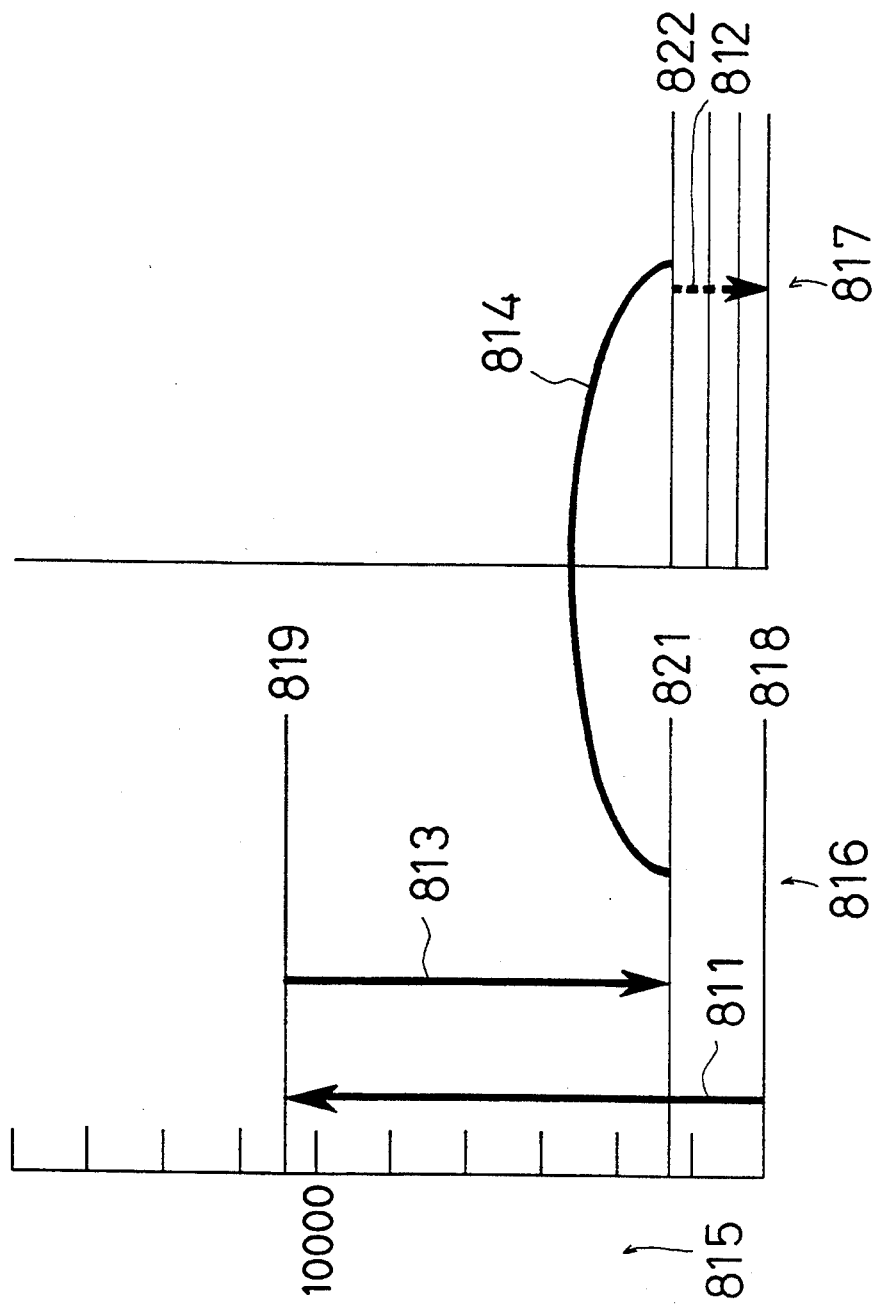
FIG. 14 is a view showing the energy level transition of rare earth ions with which an optical material of the laser element is doped according to the eighth embodiment of the present invention.

FIG. 14 is a view showing the energy level transition of rare earth ions with which the laser element is doped according to the eighth embodiment of the present invention. In FIG. 14, the reference numeral 816 denotes the energy level transition of Pr ion, the reference numeral 817 denotes the energy level transition of Eu ion, the reference numeral 811 denotes level transition caused by absorbing excitation energy from the pump laser 807, the reference numeral 812 denotes level transition caused by phonon emission, the reference numeral 813 denotes level transition caused by light radiation, the reference numeral 814 denotes level transition caused by energy transfer, an axis of ordinates 815 denotes energy with a unit of $cm^{-1}$, and the reference numerals 818, 819, 821 and 822 denote energy levels.

When excitation light having a wavelength of 1.017 μm is incident through the incident portion 802, the energy state of the Pr ion is shifted from the ground state energy level 818 to the high energy level 819 as shown in the level transition 811. Then, the energy state of the Pr ion is shifted from the level 819 to the level 821 as shown in the level transition 813. When the level transition 813 is carried out, light having a wavelength of 1.31 μm is radiated. The energy transfer 814 takes place between the Pr and Eu ions. Consequently, the energy state of the Eu ion is shifted from the level 822 to the level 818 by phonon emission as shown in the level transition 812.

The light radiated by the level transition from the level 819 to the level 821 is caused to resonate by reflecting films provided on both end faces of the optical fiber 801, and is then amplified. Thereafter, the light thus amplified is emitted as a laser beam from the emitting portion 803. The laser beam emitted from the emitting portion 803 is changed into parallel light by the emitting lens 804b, and is then outputted.

In the case where the laser element is doped with only the Pr ion, the fluorescence lifetime of the level 821 is long and there is an energy difference of 2000 $cm^{-1}$ or 11 more between the levels 821 and 818. Consequently, the probability of phonon emission is low so that ion population at the level 818 is decreased. Referring to the laser element according to the eighth embodiment, with Pr and Eu ions is doped the optical material forming the optical fiber 801. Consequently, energy transfer takes place between the Pr and Eu ions. Then, phonon emission in which the energy state is shifted very quickly is carried out by the Eu ion. As a result, the energy state is rapidly shifted from the level 822 to the level 818. Consequently, population inversion can efficiently be carried out between the high energy level 819 and the medium energy level 821. Referring to the laser element according to the prior art, the efficiency of the emitted light to the incident light is 13%. Referring to the laser element according to the eighth embodiment, the efficiency of the emitted light to the incident light is 30%. Thus, there can be obtained a laser element having a high efficiency.

Figure 15:
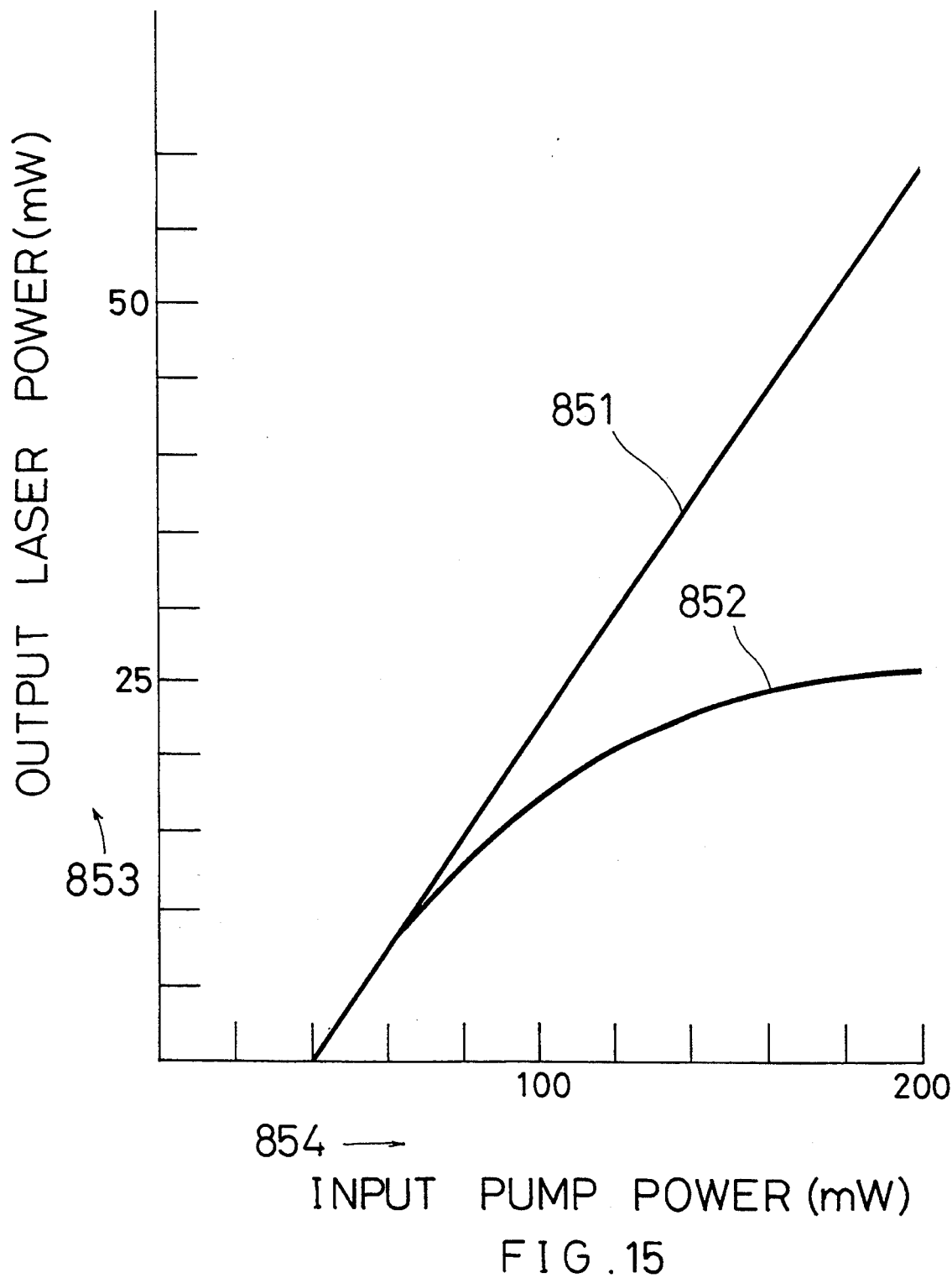
FIG. 15 is a view showing the light output characteristics of the rare earth ion doped laser element according to the eighth embodiment of the present invention.

FIG. 15 is a view showing the output characteristics of the rare earth ion doped laser element according to the eighth embodiment of the present invention. In FIG. 15, the reference numeral 851 denotes output characteristics for the input pump power of the laser element according to the eighth embodiment, and the reference numeral 852 denotes output characteristics for the input pump power of a single ion doped laser element according to the prior art. In FIG. 15, an axis of ordinates 853 denotes an output laser power with a unit of mW, and an axis of abscissas 854 denotes an input pump power with a unit of mW. As apparent from FIG. 15, even if the input pump power of the rate earth ion doped laser element according to the eighth embodiment is increased by the above-mentioned function and effect, the output laser power is not saturated. Consequently, high output can be obtained.

There will be described a rare earth ion doped optical amplifying element according to a ninth embodiment of the present invention with reference to FIGS. 16 and 17.

Figure 16:
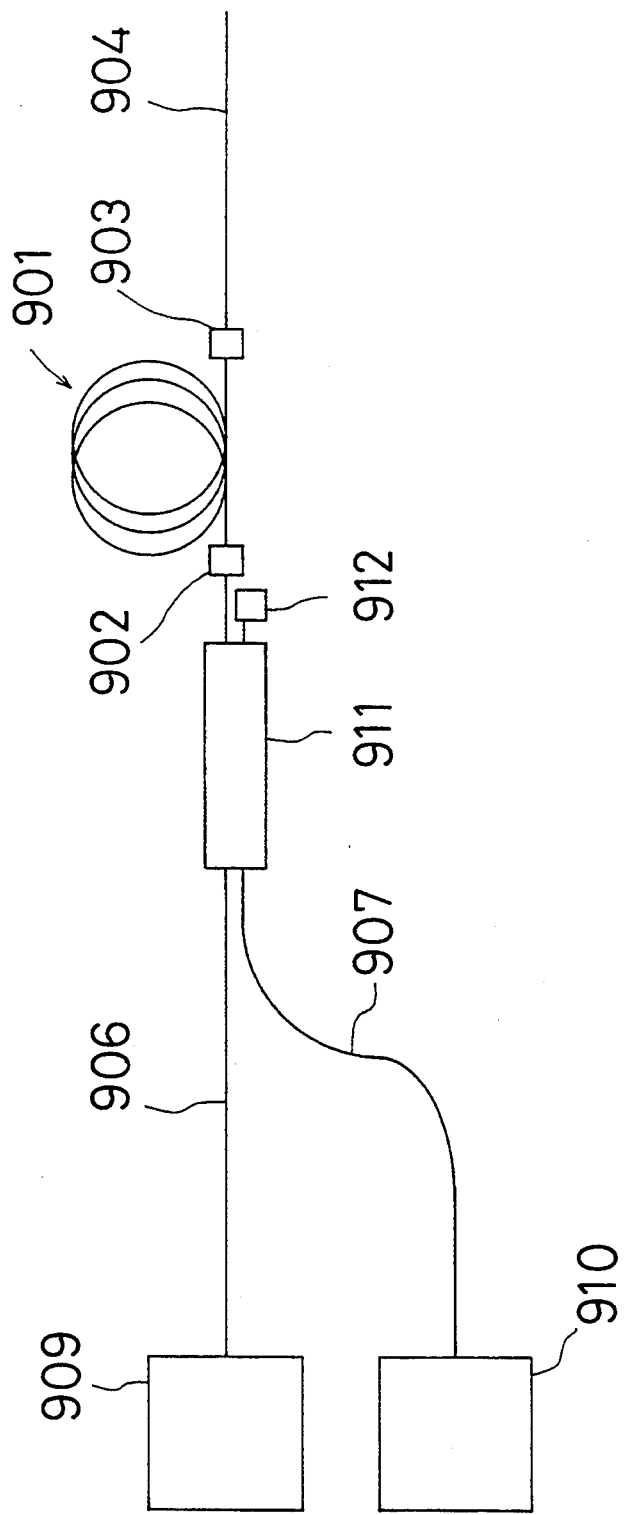
FIG. 16 is a view illustrating the structure of a rare earth ion doped optical amplifying element according to a ninth embodiment of the present invention.

In FIG. 16, the reference numeral 901 denotes an optical fiber of the rare earth ion doped optical amplifying element, which is formed by doping a fluoride optical material with 1000 to 5000 ppm of Pr ion as a first rare earth ion and 1000 to 10000 ppm of Eu ion as a second rare earth ion. In FIG. 16, the reference numeral 902 denotes an incident portion of the optical fiber 901, the reference numeral 903 denotes an emitting portion of the optical fiber 901, the reference numeral 904 denotes an optical fiber for emission which propagates output signal light in a single mode, the reference numeral 906 denotes a fiber for signal light which propagates input signal light in a single mode, the reference numeral 907 denotes a fiber for excitation light which propagates the excitation light in a single mode, the reference numeral 909 denotes a signal light source, the reference numeral 910 denotes a pump laser, the reference numeral 911 denotes an optical fiber coupler for coupling the signal light and the excitation light together, and the reference numeral 912 denotes a matching oil.

Figure 17:
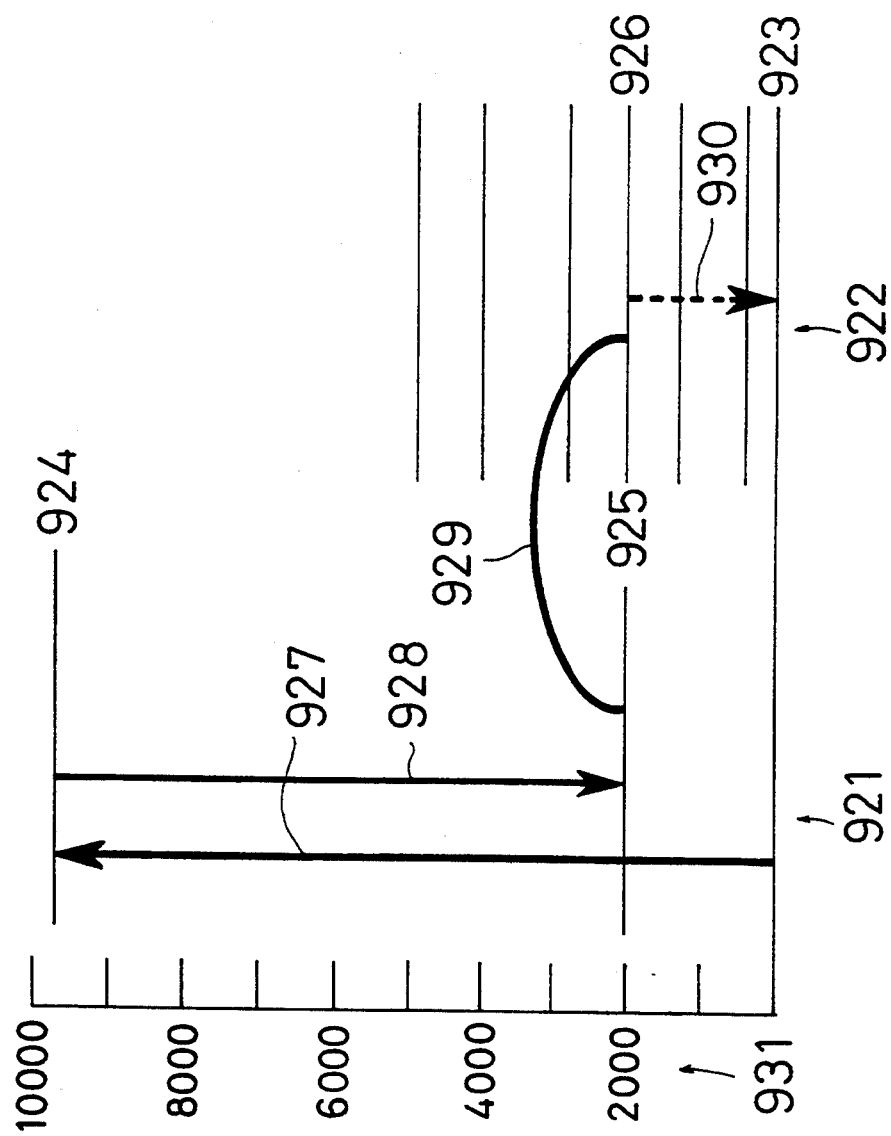
FIG. 17 is a view showing the energy level transition of rare earth ions with which an optical material of the optical amplifying element is doped according to the ninth embodiment of the present invention.
Figure 18:
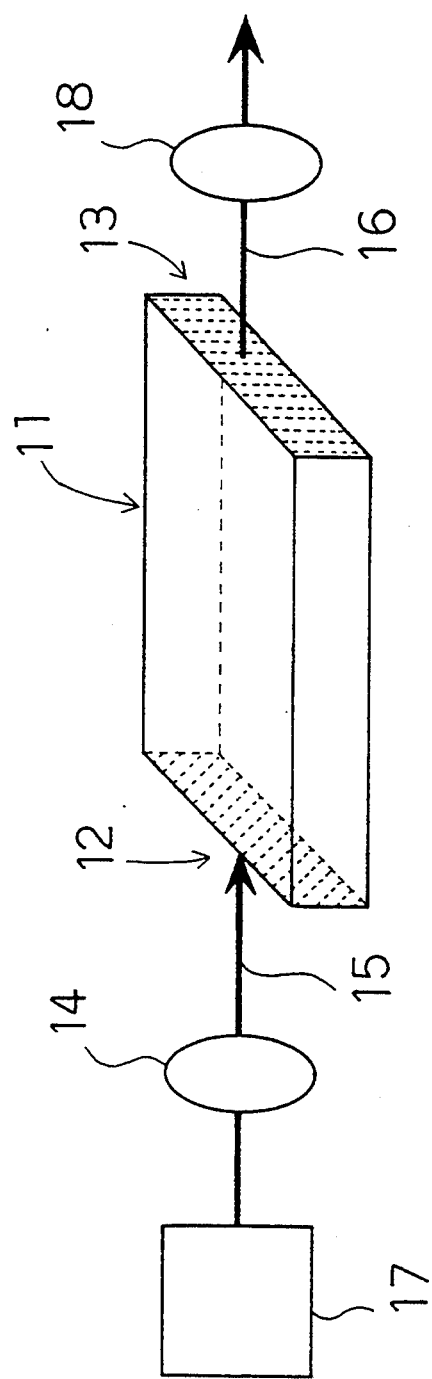
FIG. 18 is a view illustrating the structure of a rare earth ion doped laser element according to the prior art.
Figure 19:
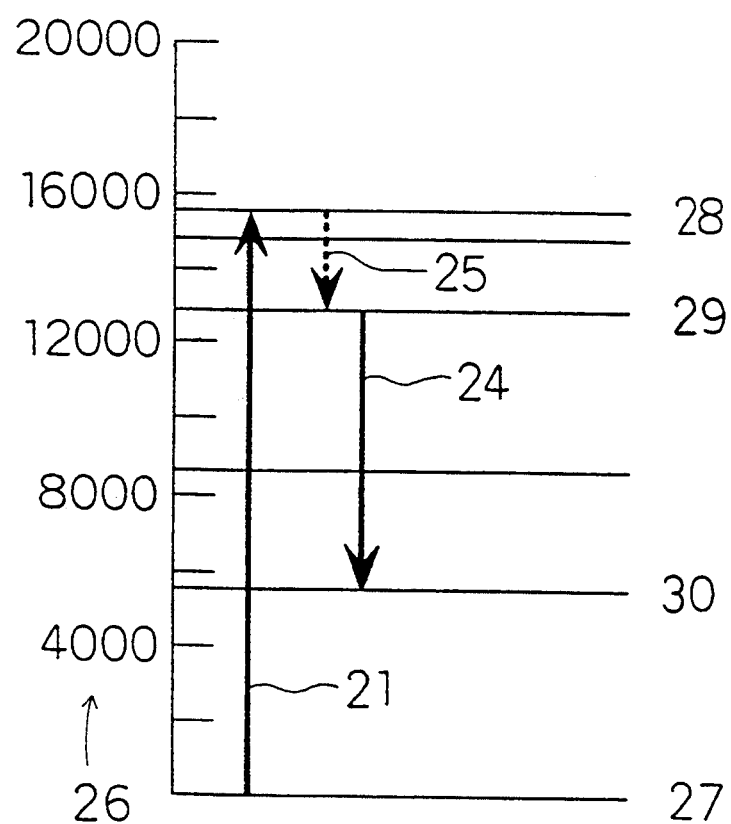
FIG. 19 is a view showing the energy level transition of a rare earth ion with which an optical material of the laser element is doped according to the prior art.
Figure 20:
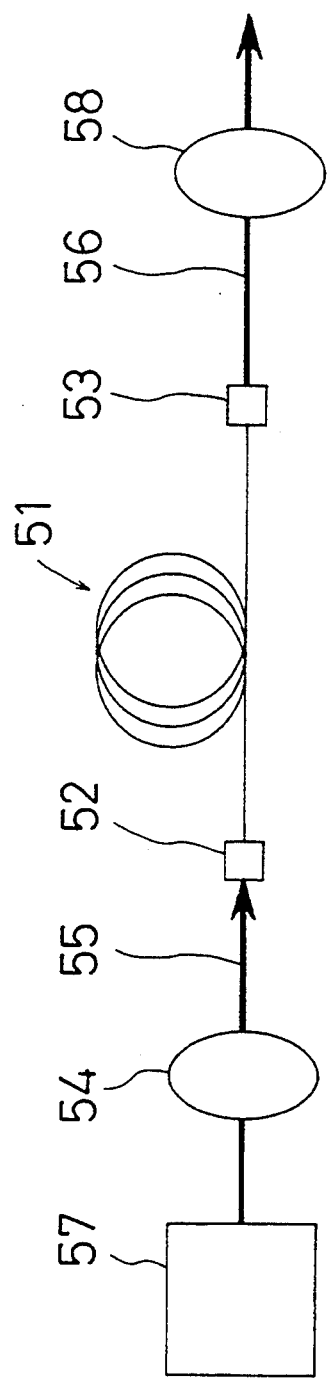
FIG. 20 is a view illustrating the structure of a rare earth ion doped laser element according to the prior art.
Figure 21:
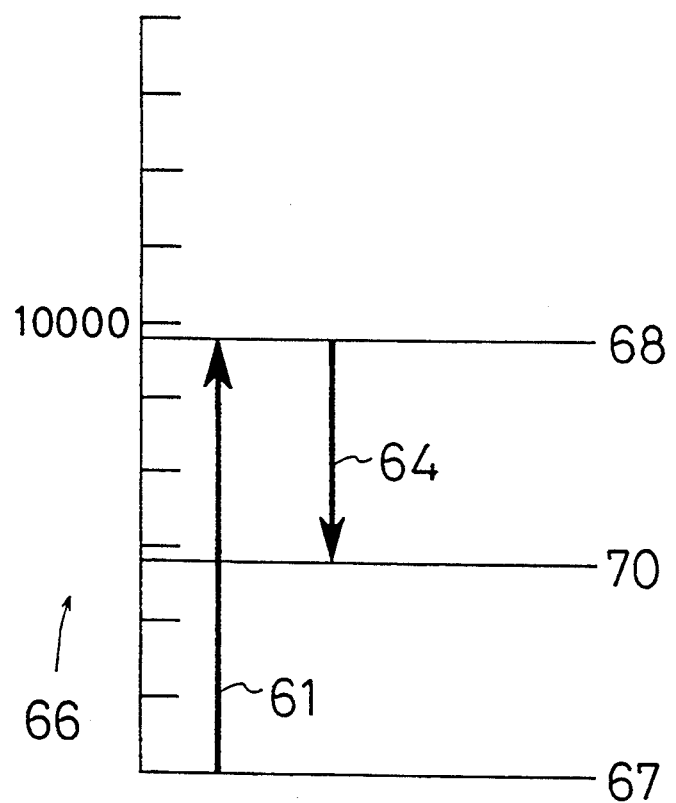
FIG. 21 is a view showing the energy level transition of a rare earth ion with which an optical material of laser element is doped according to the prior art.

In FIG. 17, the reference numeral 921 denotes the energy level transition of Pr ion, the reference numeral 922 denotes the energy level transition of Eu ion, the reference numeral 923 denotes a ground state energy level, the reference numerals 924, 925 and 926 denote energy levels, the reference numeral 927 denotes level transition caused by excitation light, the reference numeral 928 denotes level transition caused by light radiation, the reference numeral 929 denotes level transition caused by energy transfer, and the reference numeral 930 denotes level transition caused by phonon emission. An axis of ordinates 931 denotes energy with a unit of $cm^{-1}$.

Excitation light having a wavelength of 1.017 $\mu$m is emitted from the pump laser 910 and is then incident through the incident portion 902 of the optical fiber 901. Signal light having a wavelength of 1.31 $\mu$m is simultaneously emitted from the signal light source 909 and is then incident on the optical fiber 901 through the optical fiber coupler 911. Consequently, the energy state of the Pr ion is shifted from the ground state energy level 923 to the high energy level 924 by absorbing the energy of the excitation light as shown in the level transition 927. Then, the energy state of the Pr ion is shifted to the level 925 by light radiation as shown in the level transition 928. Therefore, the energy state is shifted from the level 925 of the Pr ion to the level 926 of the Eu ion by energy transfer as shown in the level transition 929, and is then shifted from the level 926 to the level 923 by phonon emission as shown in the level transition 930.

Referring to the optical amplifying element according to the prior art, in the case where the excitation light has a power of 925 mW, the amplification gain of the signal light is 30 dB. When the output laser power of the signal light exceeds 5 dBm, the gain is lowered. According to the ninth embodiment, there can be obtained a signal output laser power of 20 dBm with a high gain of 30 dB.

There will be described a rare earth ion doped optical fiber element and a rare earth ion doped optical amplifying element according to tenth and eleventh embodiments of the present invention, respectively. Since the structures of the optical fiber element and optical amplifying element are the same as that of the optical fiber element shown in FIG. 11, they are not shown.

Referring to the optical fiber element and optical amplifying element according to the tenth and eleventh embodiments, with Pr ion as a first rare earth ion, Eu ion as a second rare earth ion and Yb ion as a rare earth ion of a third type (hereinafter referred to as a third rare earth ion) is doped a fluoride optical material forming an optical fiber. The energy level $^2F_{5/2}$ of the Yb ion is almost equal to the energy level $^1G_4$ of the Pr ion. The energy absorption coefficient of the Yb ion is several times as large as that of the Pr ion.

As described above, when excitation light having a wavelength of 0.9 to 1.0 $\mu$m is incident through the incident portion of the rare earth ion doped optical fiber, the energy of the excitation light is absorbed by the Yb ion at the level $^2F_{5/2}$. Then, energy is transferred to the Pr ion at the level $^1G_4$.

Referring to the rare earth ion doped optical fiber element according to the tenth embodiment, energy level transition 714, energy transfer 716 and energy level transition 715 are carried out as shown in FIG. 12 in similar to the seventh embodiment. Referring to the rare earth ion doped optical amplifying element according to the eleventh embodiment, energy level transition 928, energy transfer 929 and energy level transition 930 are carried out as shown in FIG. 17 in similar to the ninth embodiment.

While the Tm and Eu ions, and the Pr and Eu ions are used for dopants in the above-mentioned embodiments, various rare earth ions are used for 3-level and 4-level optical elements and can be used as first rare earth ions of the present invention. Not only Eu ions but also Tb ions, Sm ions or metal ions can be used as second rare earth ions.

While the fluoride optical material is used for forming the optical fiber in the above-mentioned embodiments, the present invention can also be applied to a $SiO_2$ optical fiber. In addition, $YLiF_4$, YAG and the like may be used as an optical material forming a laser crystal.

While the excitation light has a wavelength of 650 nm, 780 nm or 1.017 $\mu$m in the above-mentioned embodiments, light having any wavelength can be used according to uses and the energy level of the rare earth ion.

While the radiative level transition of the Pr ion has been described in the above-mentioned embodiments, it has been known that light is emitted at a wavelength of 2.7 $\mu$m by the Eu ion. The optical fiber doped with the Pr and Eu ions can greatly contribute to the emission of a laser beam having a wavelength of 2.7 $\mu$m based on the principle of energy transfer according to the present invention.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A rare earth ion doped solid state optical element, made of an optical material doped with Tm ion and a second rare earth ion different from said Tm ion, wherein
   said Tm ion is adapted
   (i) to be raised in energy from a ground state level to a first energy level by absorption transition from said ground state level to said first energy level or by absorption transition from said ground state level to a second energy level which is higher than said first energy level followed by non-radiative transition from said second energy level to said first energy level, said absorption transition caused by absorbing an exciting light which has a wavelength corresponding to a wavelength of light that said Tm ion absorbs,
   (ii) to be raised in energy from said first energy level to a third energy level by absorption transition, caused by absorbing exciting light of 650±10 nm wavelength,
   (iii) to be lowered in energy from said third energy level to a fourth energy level by radiative transition, and
   (iv) to be lowered in energy from said fourth energy level to said ground state level by non-radiative transition, caused by energy transfer from said Tm ion to said second rare earth ion when said Tm ion is at said fourth energy level.

2. The rare earth ion doped solid state optical element according to claim 1, wherein said second rare earth ion is Eu ion.

3. The rare earth ion doped solid state optical element according to claim 1, wherein said optical material comprises a fluoride material or a $SiO_2$ material.

4. A rare earth ion doped optical fiber element, comprising an optical material having a high refractive index area which is doped with Tm ion and a second rare earth ion different from said Tm ion and a low refractive index area surrounding said high refractive index area, wherein
   said Tm ion is adapted
   (i) to be raised in energy from a ground state level to a first energy level by absorption transition from said ground state level to said first energy level or by absorption transition from said ground state level to a second energy level which is higher than said first energy level followed by non-radiative transition from said second energy level to said first energy level, said absorption transition caused by absorbing an exciting light which has a wavelength corresponding to a wavelength of light that said Tm ion absorbs,
   (ii) to be raised in energy from said first energy level to a third energy level by absorption transition, caused by absorbing an exciting light of 650±10 nm wavelength,
   (iii) to be lowered in energy from said third energy level to a fourth energy level by radiative transition, and
   (iv) to be lowered in energy from said fourth energy level to said ground state level by non-radiative transition, caused by energy transfer from said Tm ion to said second rare earth ion when said Tm ion is at said fourth energy level.

5. The rare earth ion doped optical fiber element according to claim 4, wherein said second rare earth ion is Eu ion.

6. The rare earth ion doped optical fiber element according to claim 4, wherein said optical material comprises a fluoride material or a $SiO_2$ material.

7. A rare earth ion doped laser element, made of an optical material doped with Tm ion and a second rare earth ion different from said Tm ion, comprising an incident portion and an emission portion which forms a resonator together with said incident portion, wherein
   said Tm ion is adapted
   (i) to be raised in energy from a ground state level to a first energy level by absorption transition from said ground state level to said first energy level or with absorption transition from said ground state level to a second energy level which is higher than said first energy level followed by non-radiative transition from said second energy level to said first energy level, said absorption transition caused by absorbing an exciting light which has a wavelength corresponding to a wavelength of light that said Tm ion absorbs,
   (ii) to be raised in energy from said first energy level to a third energy level by absorption transition, caused by absorbing an exciting light of 650±10 nm wavelength,
   (iii) to be lowered in energy from said third energy level to a fourth energy level by radiative transition,
   (iv) to exhibit population inversion between said fourth energy level and said third energy level, and
   (v) to be lowered in energy from said fourth energy level to said ground state level by non-radiative transition, caused by energy transfer from said Tm ion to said second rare earth ion when said Tm ion is at said fourth energy level, and
   said rare earth ion doped laser element emits, from said emission portion, the light which corresponds to the energy difference between said third energy level and said fourth energy level.

8. The rare earth ion doped laser element according to claim 7, wherein said second rare earth ion is Eu ion.

9. The rare earth ion doped laser element according to claim 7, wherein said optical material comprises a fluoride material or a $SiO_2$ material.

10. A rare earth ion doped optical amplifying element, made of an optical material doped with Tm ion and a second rare earth ion different from said Tm ion, comprising an incident portion and an emission portion, wherein
    said Tm ion is adapted
    (i) to be raised in energy from a ground state level to a first energy level by absorption transition from said ground state level to said first energy level or by absorption transition from said ground state level to a second energy level which is higher than said first energy level followed by non-radiative transition from said second energy level to said first energy level, said absorption transition caused by absorbing exciting light which has a wavelength corresponding to a wavelength of light that said Tm ion absorbs, (ii) to be raised in energy from said first energy level to a third energy level by absorption transition, caused by absorbing an exciting light of 650±10 nm wavelength, (iii) to amplify a signal light incident through said incident portion by the lowering of said Tm ion in energy from said third energy level to a fourth energy level by radiative transition, and (iv) to be lowered in energy from said fourth energy level to said ground state level by non-radiative transition, caused by the energy transfer from said Tm ion to said second rare earth ion when said Tm ion is at said fourth energy level, and said rare earth ion doped optical amplifying element emits said signal light amplified by said Tm ion from said emission portion.

11. The rare earth ion doped optical amplifying element according to claim 10, wherein said second rare earth ion is Eu ion.

12. The rare earth ion doped optical amplifying element according to claim 10, wherein said optical material comprises a fluoride material or a $SiO_2$ material.

* * * * *